United States Patent
Swartz et al.

(10) Patent No.: US 6,853,293 B2
(45) Date of Patent: *Feb. 8, 2005

(54) WEARABLE COMMUNICATION SYSTEM

(75) Inventors: Jerome Swartz, Old Field, NY (US); Michael Slutsky, East Setauket, NY (US); Simon Bard, Setauket, NY (US); Stephen J. Shellhammer, Lake Grove, NY (US); James Connelly, Lake Grove, NY (US); Margaret L. Hetfield, East Northport, NY (US); Jacob Sharony, Port Washington, NY (US); Michael A. Ramputi, Port Jefferson Station, NY (US); Paul R. Poloniewicz, East Setauket, NY (US); Joseph Katz, Stony Brook, NY (US); Robert E. Beach, Los Altos, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/253,177
(22) Filed: Sep. 24, 2002
(65) Prior Publication Data

US 2003/0020629 A1 Jan. 30, 2003

Related U.S. Application Data

(63) Continuation of application No. 09/304,296, filed on May 3, 1999, now abandoned, which is a continuation-in-part of application No. 09/010,908, filed on Jan. 22, 1998, now abandoned, which is a continuation-in-part of application No. 08/531,492, filed on Sep. 21, 1995, now abandoned, which is a continuation of application No. 08/068,026, filed on May 28, 1993, now abandoned.

(51) Int. Cl.⁷ ............................................. H04Q 1/00
(52) U.S. Cl. ........................... 340/5.92; 235/462.15; 235/472.01
(58) Field of Search ................ 340/5.92; 235/462.15, 235/462.44, 462.45, 375, 472.02, 472.01; 200/61.01

(56) References Cited

U.S. PATENT DOCUMENTS

| | | | |
|---|---|---|---|
| 1,165,970 A | | 12/1915 | Harris |
| 3,337,992 A | * | 8/1967 | Tolson ......................... 49/29 |
| 3,588,359 A | | 6/1971 | Cribb |

(List continued on next page.)

FOREIGN PATENT DOCUMENTS

| | | |
|---|---|---|
| EP | 0264956 | 4/1988 |
| EP | 0 373 935 A3 | 6/1990 |
| EP | 0 471 291 A2 | 2/1992 |

Primary Examiner—Brian Zimmerman
(74) Attorney, Agent, or Firm—Hogan and Hartson LLP

(57) ABSTRACT

A portable data input or computer system includes an input/output device such as a keyboard and a display, another data input device such as an optical bar code scanner, and a data processor module. To scan bar code type indicia, the operator points the scanner at the bar code and triggers the scanner to read the indicia. All the system components are distributed on an operator's body and together form a personal area system (PAS). Components may include a scanner or imager, a wrist unit, a headpiece including an eyepiece display, speaker and a microphone. Components within a particular PAS communicate with each other over a personal area network (PAN). Individual PASs may be combined into a network of PASs called a PAS cluster. PASs in a particular PAS cluster can communicate with each other over another wireless communication channel. Individual PAS can gain access to a Local Area Network (LAN) and/or a Wide Area Network (WAN) via an access point. Individual PASs can use devices, such as servers and PCs situated either on the LAN or the WAN to retrieve and exchange information. Individual PAS components can provide automatic speech and image recognition. PAS components may also act a telephone, a pager, or any other communication device having access to a LAN or a WAN. Transmission of digitized voice and/or video data can be achieved over an Internet link.

26 Claims, 17 Drawing Sheets

U.S. PATENT DOCUMENTS

| | | |
|---|---|---|
| 4,251,798 A | 2/1981 | Swartz et al. |
| 4,286,145 A | 8/1981 | Palmer |
| 4,360,798 A | 11/1982 | Swartz et al. |
| 4,369,361 A | 1/1983 | Swartz et al. |
| 4,387,297 A | 6/1983 | Swartz et al. |
| 4,409,470 A | 10/1983 | Shepard et al. |
| 4,460,120 A | 7/1984 | Shepard et al. |
| 4,467,196 A | 8/1984 | Balliet et al. |
| 4,496,831 A | 1/1985 | Swartz et al. |
| 4,589,134 A | 5/1986 | Waldron |
| 4,593,186 A | 6/1986 | Swartz et al. |
| D284,903 S | 8/1986 | Rose |
| 4,607,156 A | 8/1986 | Koppenaal et al. |
| 4,673,803 A | 6/1987 | Zerle et al. |
| 4,719,462 A | 1/1988 | Hawkins |
| 4,722,625 A | 2/1988 | O'Brien |
| 4,736,095 A | 4/1988 | Shepard et al. |
| 4,739,316 A | 4/1988 | Yamaguchi et al. |
| 4,758,717 A | 7/1988 | Shepard et al. |
| 4,760,248 A | 7/1988 | Swartz et al. |
| 4,766,299 A | 8/1988 | Tierney et al. |
| 4,794,239 A | 12/1988 | Allais |
| 4,808,804 A | 2/1989 | Krichever et al. |
| 4,816,660 A | 3/1989 | Swartz et al. |
| 4,816,661 A | 3/1989 | Krichever et al. |
| 4,825,057 A | 4/1989 | Swartz et al. |
| 4,825,471 A | 5/1989 | Jennings |
| 4,827,534 A | 5/1989 | Haugen |
| 4,835,374 A | 5/1989 | Swartz et al. |
| 4,845,650 A | 7/1989 | Meade et al. |
| 4,871,904 A | 10/1989 | Metlitsky |
| 4,876,724 A | 10/1989 | Suzuki |
| 4,896,026 A | 1/1990 | Krichever et al. |
| 4,899,039 A | 2/1990 | Taylor et al. |
| 4,916,441 A * | 4/1990 | Gombrich .................. 345/169 |
| 5,014,046 A | 5/1991 | Minami |
| 5,105,067 A | 4/1992 | Brekkestran et al. |
| 5,144,120 A | 9/1992 | Krichever et al. |
| 5,191,197 A | 3/1993 | Metlitsky et al. |
| 5,208,449 A | 5/1993 | Eastman et al. |
| 5,210,398 A | 5/1993 | Metlitsky |
| 5,212,372 A | 5/1993 | Quick et al. |
| 5,272,324 A | 12/1993 | Blevins |
| 5,276,315 A | 1/1994 | Surka |
| 5,285,398 A | 2/1994 | Janik |
| 5,304,786 A | 4/1994 | Pavlidis et al. |
| 5,305,181 A | 4/1994 | Schultz |
| 5,305,244 A | 4/1994 | Newman et al. |
| 5,309,351 A | 5/1994 | McCain et al. |
| 5,587,577 A * | 12/1996 | Schultz .................. 235/462.44 |
| 5,610,387 A * | 3/1997 | Bard et al. ............. 235/462.44 |
| 5,677,834 A | 10/1997 | Mooneyham |
| 5,844,824 A * | 12/1998 | Newman et al. ............ 345/156 |
| 5,856,660 A * | 1/1999 | Bard et al. ............. 235/462.15 |
| 5,898,161 A * | 4/1999 | DeVita et al. ......... 235/462.44 |
| 6,003,774 A * | 12/1999 | Bard et al. ............. 235/462.45 |
| 6,006,100 A * | 12/1999 | Koenck et al. ............ 455/466 |
| 2002/0017567 A1 * | 2/2002 | Connolly et al. ...... 235/472.02 |
| 2002/0030094 A1 * | 3/2002 | Curry et al. ................ 235/375 |

* cited by examiner

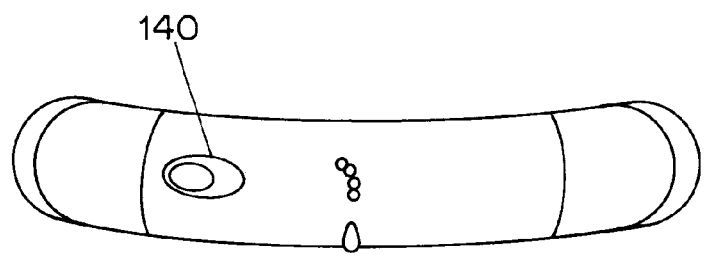
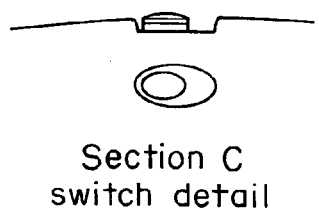
FIG. 10a
Section C
switch detail
FIG. 10b
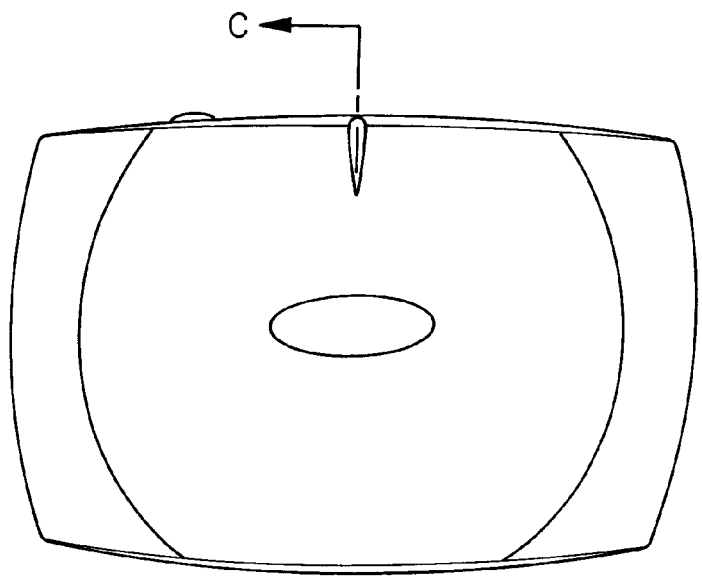
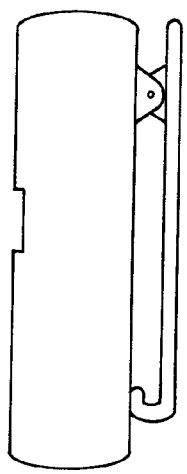
FIG. 10c
FIG. 10d

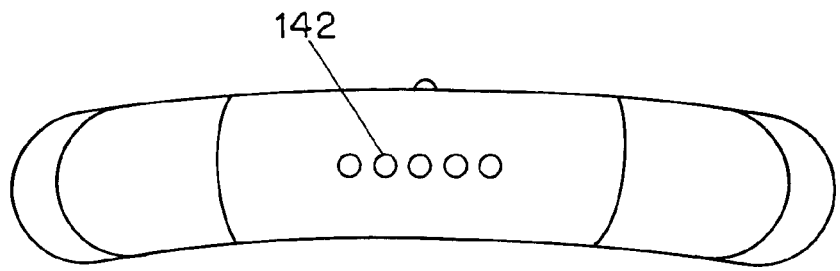
FIG. 10e
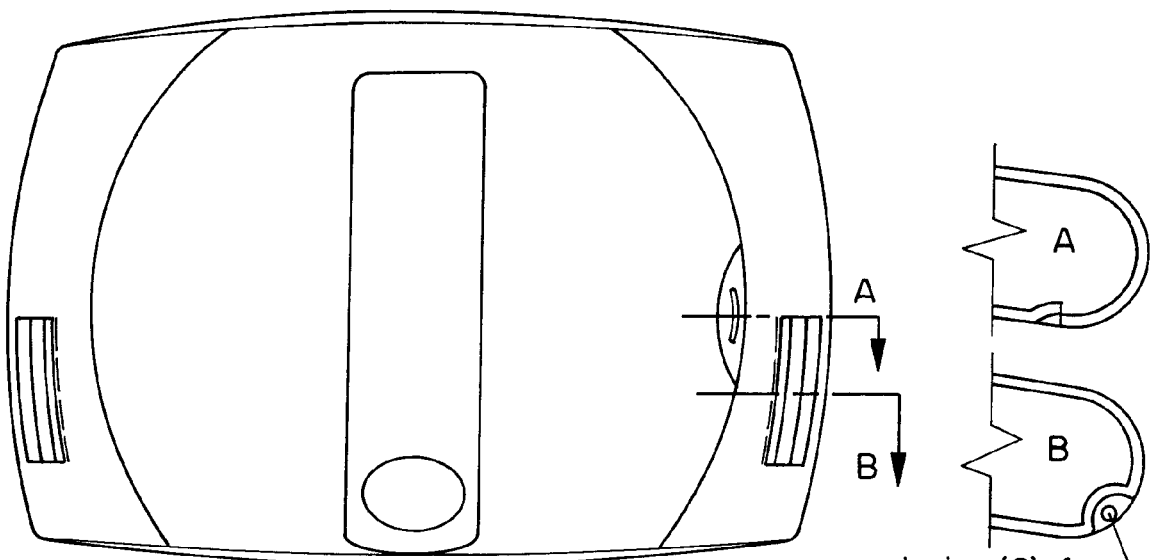
FIG. 10f
curved wire (2) for belt sash
FIG. 10g
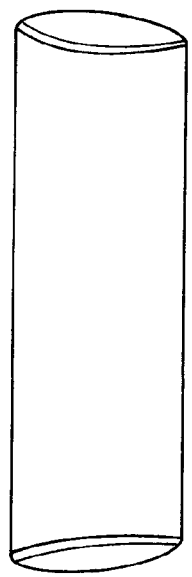
FIG. 10h

WEARABLE COMMUNICATION SYSTEM

RELATED APPLICATIONS

This application is a continuation of U.S. application Ser. No. 09/304,296 filed May 3, 1999 now abandoned which is a continuation-in-part of U.S. application Ser. No. 09/010,908 filed Jan. 22, 1998 now abandoned which is a continuation-in-part of U.S. application Ser. No. 08/531,492 filed Sep. 21, 1995 now abandoned which is a continuation of U.S. application Ser. No. 08/068,026 filed May 28, 1993. This application is related to U.S. application Ser. No. 08/381,516 file Feb. 1, 1995, now U.S. Pat No. 5,793,032 which is incorporated herein by reference.

TECHNICAL FIELD

The present invention relates to a portable computer or data input system, typically including an optical scanner, or imager, wherein the system is incorporated into a special utility harness resembling a tool belt or the like worn by the system operator. The present invention also relates to a portable data communication system, typically including an optical scanner, or imager, wherein the system is distributed on an operators body and wherein system components communicate with each other over a wireless communication network. The present invention also relates to a portable data communication system, typically including an optical scanner, or imager, being distributed on an operator's body and capable of communicating with other devices over a Local Area Network or/and a Wide Area Network.

BACKGROUND ART

Optical readers, such as bar code readers, are now common. Typically, a bar code comprises a series of encoded symbols, and each symbol consists of a series of light and dark regions, generally in the form of rectangles. The widths of the dark regions, the bars, and/or the widths of the light spaces between the bars indicate the encoded information. A bar code reader illuminates the code and senses light reflected from the code to detect the widths and spacings of the code symbols and derive the encoded data.

Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the bar code readers. Many applications require the operator to carry the bar code reader about as the operator moves from place to place and to operate the reader manually to scan codes appearing on different objects. The readers therefore must be easy and convenient to operate and carry.

Many applications additionally require use of the bar code reader with other data input means, for example by incorporation of all the elements into a single integrated data input terminal. Such integrated systems typically include a keyboard, for input of alphanumeric data which may or may not be related to bar code data, a central data processor unit having associated RAM and ROM, and a display. Integrated terminals of this type have been proposed which are small enough to be handheld (see e.g. U.S. Pat. Nos. 4,916,441 and 5,144,120). Such units incorporating so many different elements, however, tend to be larger than many dedicated bar code readers and cumbersome to operate as bar code readers, particularly for extended periods. Also, conventional integrated devices often require the operator to hold the device in one hand and operate the keyboard with the other. Such operation requires use of both hands and does not allow the user to perform other manual tasks at the same time. These problems, together with problems related to securing and carrying the integrated terminals when not in use, tend to discourage employees from using the data input system, thereby defeating the purpose of the system and particularly the advantages otherwise associated with bar code data entry. Similar problems exist in other types of portable computer or data devices.

From the above discussion of the state of the art, it becomes clear that a need still exists to produce portable computer or data input terminal systems, particularly ones incorporating an optical reader unit, which are particularly convenient to carry and operate.

In addition, the need exists to ergonomically distribute the elements of the data input terminal system on an operator's body.

The need also exists to wirelessly interconnect the different elements of the system on the operator's body.

Once the system consisting of different components has been incorporated to be worn on the operator's body, the need arises to be able to connect one operator with another operator having a similar system via a wireless communication channel.

In addition, the need arises to provide additional functionality to the operator, by interconnecting his system with a local area network (LAN), such as an Ethernet, and/or wide area network (WAN), such as an internet.

The need also exists for a miniature voice communication system for enabling voice communication over a specified protocol, such as an Internet protocol, the system having voice recognition capabilities for hands free operation.

The need also exists to enable data transfers between the devices which are part of the personal area system and the devices attached to LAN or WAN.

The need also exists to enable voice and video data transfers between the elements of the personal area system and the devices attached to the LAN or WAN.

The need also exists to enable automatic voice recognition of the user commands made during the indicia reading operation of the personal area system.

SUMMARY OF THE INVENTION

The present invention addresses the above problems and needs through the design of a portable computer system with some of the system components incorporated into an item of personal wear, for example into a work or utility harness such as tool belt.

The harness has a number of separate means for supporting objects to be carried by the wearer. The support means may be fasteners attached to the harness, for example Velcro™ tabs. In the preferred embodiment, the support means are pockets sewn in the harness in the form of a belt. In this embodiment, a module containing the data processor is secured in one of the pockets, for example by Velcro™ strips. One or more data input devices are carried in other pockets of the belt. In the preferred embodiment, the data input devices include a keyboard and an optical reading unit for reading optically encoded indicia.

As used in this specification and in the appended claims, the term "indicia" broadly encompasses not only symbol patterns composed of alternating bars and spaces of various widths commonly referred to as bar code symbols, but also other one or two dimensional graphic patterns, as well as alphanumeric characters. In general, the term "indicia" may apply to any type of pattern or information which may be recognized or identified by scanning energy across it-and detecting reflected or scattered energy as a representation of variations in energy reflectivity at various points of the pattern or information. A bar code is one example of "indicia" which the present invention can scan, preferably by using an optical reading unit in the form of a small moving spot laser beam scanner. An optical scanner can also be in the form of a solid state imaging device, such as a one-dimensional or two-dimensional CCD, or CMOS, scanners or imagers. Radio Frequency tags also represent a type of indicia carrying components which are interrogated using an RF interrogation scanner. RF scanners can be used in point-of-sale transactions and in electronic article surveillance (EAS) systems. For the purpose of the following discussion an indicia type can mean any one of the different information carrying environments, and a scanner can mean any one of the corresponding indicia reading devices.

The keyboard permits single handed operation in the pocket (by placing the hand in the same pocket); but the keyboard can be removed, held in one hand and operated by the other hand. The keyboard contains a limited key set, however, the keyboard is programmable or trainable for specific operations and allows "chord"-ing of key activations to increase the functionality of the limited key set.

One or more batteries contained in pockets or otherwise supported on the belt provide all operating power for the system. Preferably, the batteries are rechargeable. Flexible cables or conductors carry the power from the batteries and carry all signals going to and from the various system components. The cables carrying the signals may be electrical cables or optical fibers. The cables or conductors may be sewn into channels in the belt or woven into the fabric of the belt if not leather. The cables to the optical reading unit and the keyboard have sufficient length to allow the operator to remove those units from the holstered positions in the respective pockets during use.

The portable data system also includes data output means carried by the belt. These output means might provide a perceptible indication of data to an operator wearing the belt, and might also permit data communication to a host computer system.

The preferred embodiment uses a flip-up display structure as one means for outputting data from the processor module. More specifically, the central processor unit is contained in a module secured on the belt, for example in a pocket on the front of the belt, or a vertical shoulder strap of a work harness. A hinge movably attaches the display to the module housing. In one position, the display is retracted or pivoted out of the way. In another position, however, the display extends out from the module housing so that data shown on the display is visible to the operator. In this hinged configuration, the display may be attached to a flap or fold of the pocket. A microswitch may be used to control display power so that display power is off when the display is in the retracted position, and display power is on when the display is positioned for viewing of data by the operator. While the invention contemplates using many different display technologies, the preferred embodiment of the invention discloses the use of flat panel displays.

A connector and/or cabling can be used as another output means to facilitate connection of the data processor to a host computer for communication of data therebetween. In another embodiment, the portable computer includes a wireless transceiver for use in a communications system having at least one base/data transfer station for receiving data from a plurality of portable computers. The base/data transfer station then sends the data from the portable computer to a central processing unit or host computer.

The invention is also directed at a new ergonomic allocation of scanning system components on an operator's body. The scanning system comprises a scanning unit and a computer for processing data. The computer includes a CPU and input/output ports, such as keyboard and a display. The computer can be further broken up into a CPU unit and an input/output unit. In such an embodiment, the distributed system includes a CPU unit, an input/output (I/O) unit and a scanning unit. The scanner can be a hand-held or a wearable scanner, such as a ring scanner manufactured by Symbol Technologies, the assignee of the present invention. The ring scanner can communicate with the I/O unit over a wired cable or a wireless channel. The wireless channel could be an RF or and infrared channel.

A bar code scanner, a wrist unit and a CPU unit can be distributed on an operator's body in such a way as to minimize fatigue and to enhance ergonomic usefulness of the overall system. In addition to the three components listed above, the system may also include additional peripheral components, such as a printer, a magnetic-stripe reader, heads-up display, tactile gauge-sensor or any other needed devices. The individual components communicate with each other using a wireless communication channel, preferably a short range communication channel. This wireless connectivity can be achieved via a short range local network, often called a Personal Area Network (PAN). The communication channel can be, but is not limited to, a radio frequency (RF), an infra-red (IR), or an acoustic communication channel. Thus, communication with the bar code scanner is established via a bi-directional or a uni-directional wireless link. In case this link is bi-directional, the bar code scanner includes a transmitter and a receiver. In case this link is uni-directional, the bar code scanner includes only a transmitter. In certain configurations, the wrist unit and the CPU unit may be combined into a single unit called a controller. The components distributed on an operator's body form a network called a Personal Area System (PAS). The PAS components communicate over a Personal Area Network (PAN).

Individual PASs may be combined into a network of PASs called a PAS cluster. PASs in a particular PAS cluster can communicate with each other over a medium or a long range wireless communication channel, such as a Spectrum24 communication channel.

Regardless of the embodiment, an individual PAS gains access to a Local Area Network (LAN) such as an Ethernet, and/or a Wide Area Network (WAN), such as an Internet, via an access point. Individual PASs can use devices, such as servers and PCs situated either on the LAN or the WAN to retrieve and exchange information. Communication between the PASs and the access point is carried out using a wireless communication protocol. An embodiment is disclosed where individual PAS components provide automatic speech recognition. PAS components may also act a telephone, a pager, or any other communication device having access to a LAN or a WAN. Transmission of digitized voice and/or video data over an Internet link is also disclosed.

The invention also contemplates a miniature voice over IP (Internet Protocol) communication module capable of being designed into a headset unit having a speaker and a microphone. Alternatively, the module can be designed to be carried on other parts of the user's body for better ergonomic allocation of the user worn devices. The module is connected to another system component located either on the user's body, or a server located on a network, for voice recognition of user's commands. Thus, by providing voice recognition capabilities to a voice-over-IP communication module, the system allows for virtually hands free operation of the phone module for communication purposes.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the claims.

BRIEF DESCRIPTION OF DRAWINGS

FIGS. 10a–h are various views of the Belt CPU unit.

PREFERRED EMBODIMENT OF THE INVENTION

A portable data system includes a work or utility harness such as a tool belt, which is worn by the system operator. Usually the harness is worn on the upper portion of the body for easy access. In the example illustrated in FIG. 1, the harness is in the form of a large belt, similar to that used for holding tools or other equipment. Harness 10 contains a number of pockets or other fittings suitable for holding system components. However, the harness is not limited to a belt with pockets, and can include vertical shoulder straps (not shown) and a horizontal chest strap (not shown). While the harness is shown with pockets, other structures can be included to hold the system components, for example, large pouches, straps or rings. Whereas tool belts and other such utility harnesses are normally made of leather, the harness of the present invention can be made of any suitable material such as grip-stop nylon.

Figure 2A:
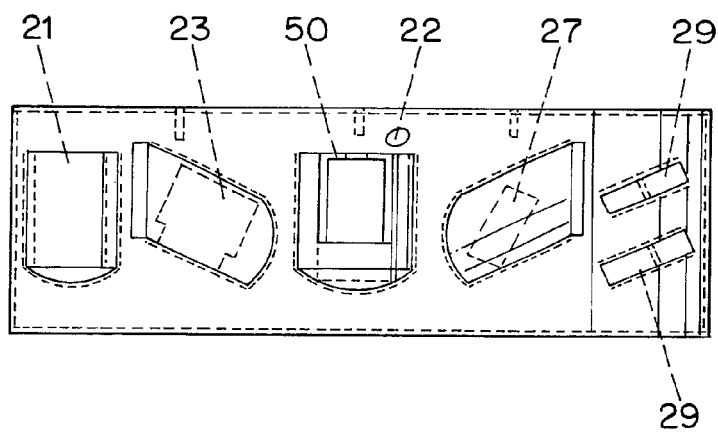
FIG. 2A is a detailed front view of the belt of the preferred embodiment.
Figure 2B:
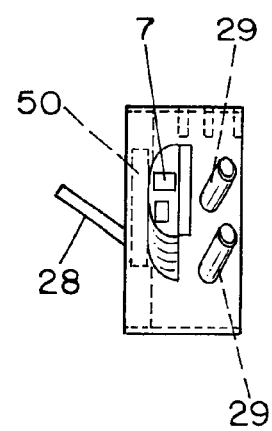
FIG. 2B is a left hand view of the belt of the preferred embodiment showing the mounting of system components.
Figure 5A:
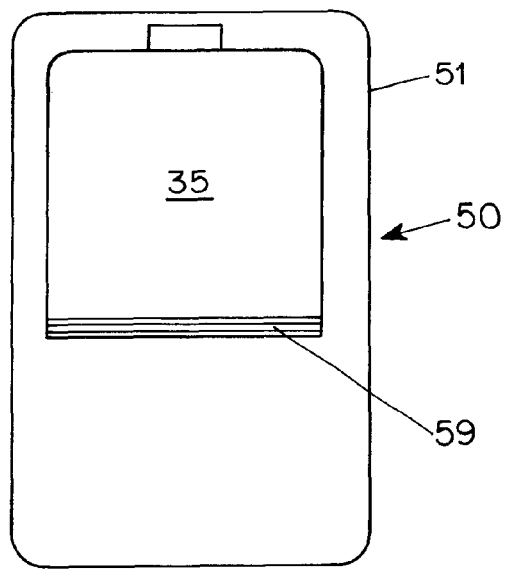
FIGS. 5a, 5b, 5c and 5d are front, side, top and back views, respectively, of the module which includes a central processor and a display.
Figure 5B:
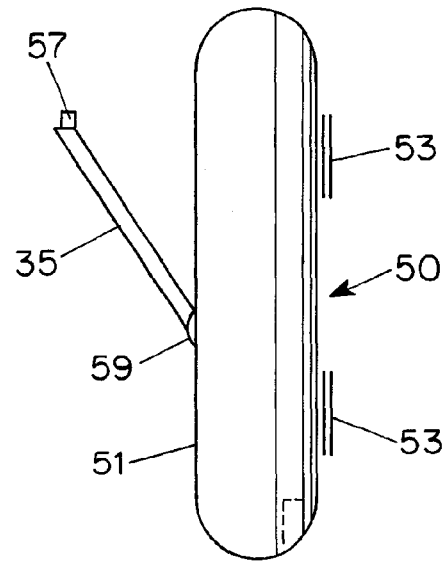

As shown in FIG. 2A, the belt has, for example, six pockets which serve as support means for carrying the various electrical components of the system, and other objects if desired. One pocket carries a module comprising the processor. The module is secured in pocket 21 in a manner to be described in more detail later with regard to FIGS. 5B–5D. Another pocket 27 carries an optical reading unit or scanner, for example, to read bar codes or the like; and pocket 23 carries a touch sensitive keyboard used for alphanumeric data input and the like. A pocket 50 in the center of the harness at the approximate location of a normal belt buckle, carries a flip-down display 22 as shown in FIG. 2B. The display is mounted in a manner discussed in more detail with regard to FIGS. 5B and 5D. In the preferred embodiment the invention uses a flat panel type display. Flat panel displays include emitting and non-emitting type displays. The emitting type displays include, but are not limited to, field emitter diode (FED) displays and light emitting diode (LED) displays such as Organic LED. The non-emitting type displays include, but are not limited to, liquid crystal displays (LCD). LCDs can further be divided into active matrix displays and passive matrix displays. An example of an active matrix display is a plasma addressed display. An example of passive matrix display is a polymer display.

The pockets 22 and 23 may have buttons, snaps, Velcro™ fasteners or the like to firmly close them and thereby secure the components inside. Pockets 29 each carry rechargeable batteries for supplying power to the electrical components of the data system. The battery pockets can include closure means or fasteners similar to those used on the other pockets. Additional pockets can be provided to allow the operator to carry other items as desired.

Figure 1:
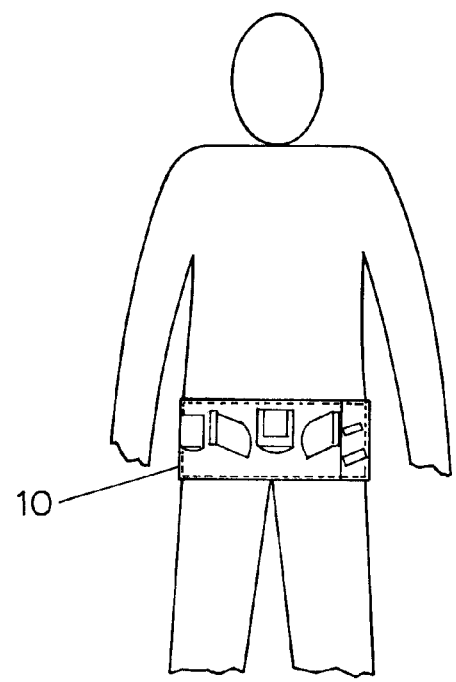
FIG. 1 is a front view of a first embodiment of the invention as fitted to a human user.

The precise layout of the pockets in the embodiment of FIGS. 1 and 2 is illustrative only, and other pocket arrangements may be used for comfort and convenience of different operators and/or to facilitate particular data input operations. Also, other support means may be used in place of one or more of the pockets. For example, detachable fasteners (e.g., Velcro™ or snaps) may be used which would directly attach one or more of the electrical components directly to the harness.

Figure 3:
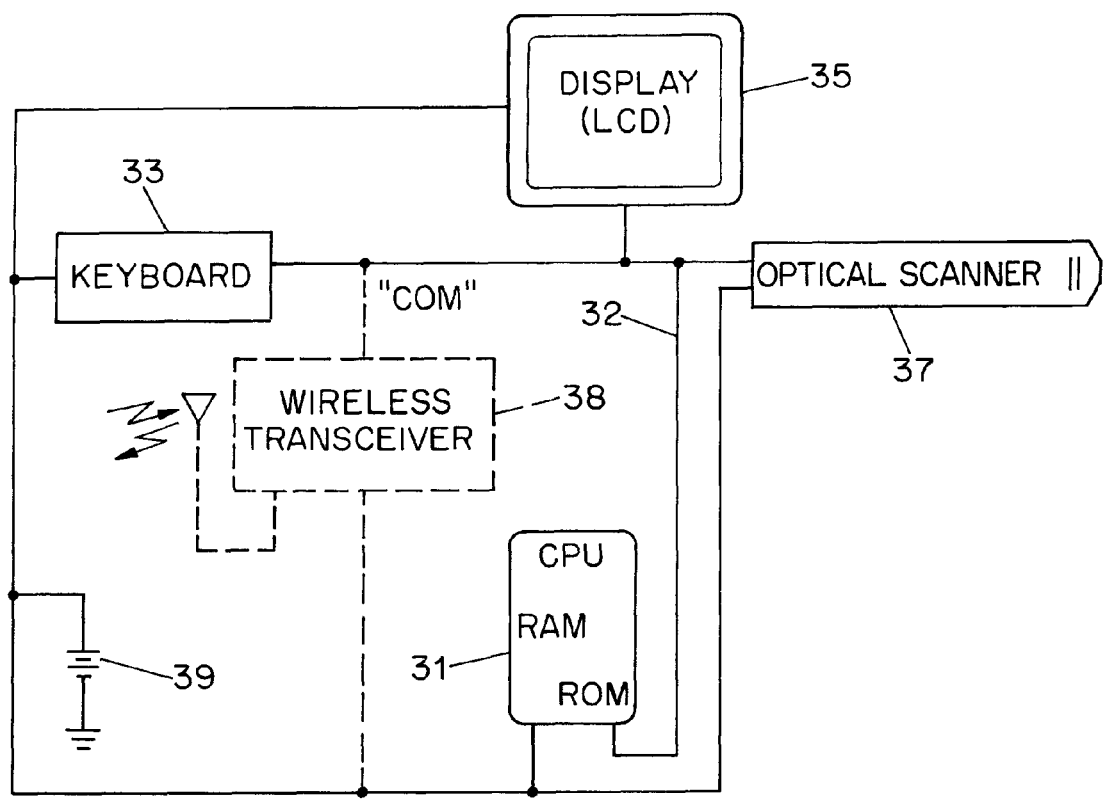
FIG. 3 is a simplified electrical block diagram of the scanner and terminal system components used in the present invention.

FIG. 3 illustrates in much simplified form the electrical components of the data system. As shown, the system includes a microprocessor based data processor 31 having a central processor unit (CPU), a random access memory (RAM) for storing data, a read only memory (ROM) for storing fixed programming data, etc. As such, the data processor 31 may consist of elements similar to those found, for example, in a 16-bit handheld or laptop type personal computer. Cable connections 32 are provided for the various signal communications between the data processor unit 31 and the keyboard 33, the liquid crystal type display (LCD)

35 and the optical scanner 37. A battery system 39 provides power to the data processor 31, the keyboard 33, the liquid crystal type display 35 and the optical scanner 37. The system may use a single battery pack in one pocket or two battery packs in two pockets (FIG. 2A), as necessary to provide adequate power for the specific system components to operate for a desired time.

Figure 5C:
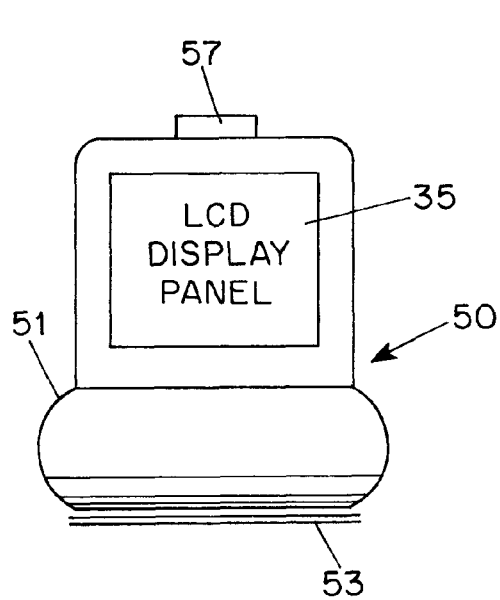
Figure 5D:
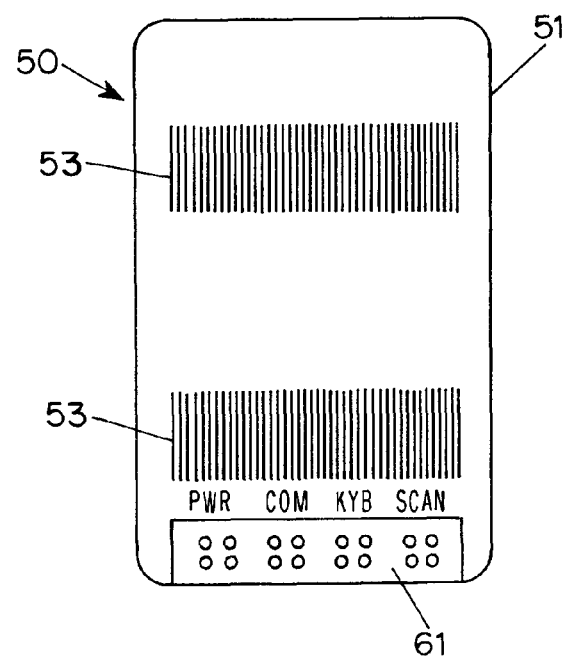

To provide a data link to an external host computer, the data processor 31 will connect to a "COM" port on the exterior of the module housing (see FIG. 5D). The COM port could be a serial or parallel type data port of a standard configuration.

FIGS. 5A to 5D show, as the main unit of the system, the processor and display module 50. The module 50 has a housing 51 which contains the data processor 31 and various associated interface circuitry. The module 50 also includes the LCD type data display device 35 attached to the housing 51 by a movable support structure, such as a hinge 59. The operator folds the display 35 when not in use up against the module housing 51, and a clasp 57 fastens it in a retracted out of the way position. The operator pulls the display 35 into a use position, out to an angle approximately vertical with respect to the module housing (see FIG. 2). The LCD components of the display 35 provide visible information output on the upper surface of the display, when so positioned. The operator can tilt his or her head down slightly, look down at the LCD 35 and read the displayed information. The top view of module 50 with the display open, as shown in FIG. 5C, essentially illustrates the operator's view of the processor and display module when looking down to read data visible on display 35. The display can be attached to a flap of the pocket by Velcro™ or the like, or it can fold out through an opening in the front wall of the pocket.

The module 50 also includes a microswitch (not shown) located so as to be sensitive to the position of the LCD display panel 35. When the display is in the closed or retracted position flush against the housing 51, the microswitch cuts off power to the display 35. When the display 35 is folded down so that data shown thereon is visible to the system operator wearing the harness, the microswitch completes the necessary circuit to supply power from the battery system 39 to the display 35.

Velcro™ strips 53 are attached to the rear surface of the module 50 (FIGS. 5B and 5D), and woolen strips (not shown) are attached at corresponding locations on the rear wall of the pocket. When the module 50 is holstered in the pocket 21, the Velcro™ and woolen strips secure that module in the belt pocket. Alternatively, the Velcro™ and woolen strips may be used to support the module 50 on the belt material without any use of a pocket.

As shown in FIG. 5D, the housing 51 has a connection panel 61 formed in the lower back section thereof The panel 61 includes a power connection "PWR" to which conductors carrying power from the battery system 39 are connected. Flexible cables from the keyboard 33 would connect to the "KYB" connector in panel 61, flexible cables from the optical scanner 37 connect to the "SCAN" connector.

Flexible cables (not shown) attached to or incorporated into the harness form the connections 22 for carrying the signals between the module 50 and the keyboard pocket 23 and the optical scanner pocket 27. Similarly, flexible cables carry power from the battery system pockets 39 to the data processor pocket 31 and display 28 in module 50 and to the keyboard 33 and the optical scanner 37. The flexible cables may take the form of wires or leads sewn into channels formed in the harness 10 or may take the form of electrical conductors woven into the harness fabric.

The panel 61 (FIG. 5D) also includes a "COM" terminal or port. This terminal permits connection of the data processor in module 50 to a communication device. For example, a cable connection from the COM terminal to a host computer system may provide for downloading data from the portable system to the host and or programming the portable system from the host. The cable from the host may be connected directly to the "COM" terminal on the module 50 by temporarily running a cable from the host into the pocket 21, or by removing the module from the pocket and making the necessary attachment.

Alternatively, the harness may include another flexible cable woven into the belt fabric or sewn into a channel in the harness essentially providing an extension of the "COM" terminal to a more convenient external point on the harness. The host computer would be connected to that external point, and the flexible cable would provide a link through the belt to the "COM" connection on the module for carrying data signals between the external host computer and the data processor 31.

The system might also include a wireless transceiver 38 (e.g. infrared or radio frequency) shown in phantom in FIG. 3. The wireless transceiver would connect via flexible cable to the COM terminal or port and would permit two way data communication between the data processor 31 and an external host computer system while the operator is wearing the harness and moving about to collect bar code data and/or inputting alphanumeric data.

In a preferred embodiment using wireless transmission, the wireless transceiver is a spread spectrum type radio transceiver contained in a separate module. The transceiver module includes shielding to prevent interference and is carried in another pocket of the harness. This embodiment of the system also includes a flexible RF antenna (not shown) connected to the spread spectrum transceiver. The antenna may be sewn on or woven into the fabric of the back portion of the harness.

Figure 7:
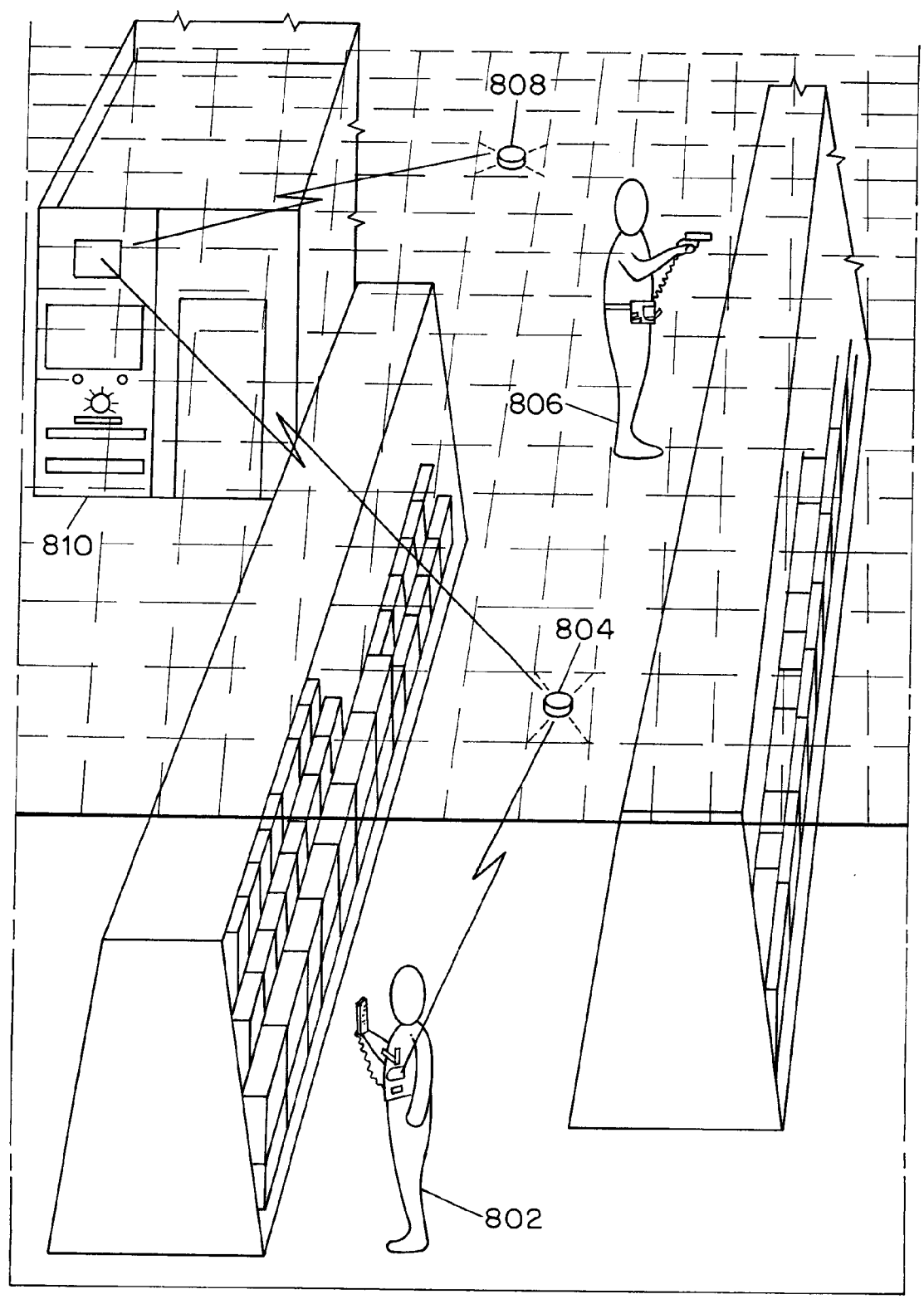
FIG. 7 is a representation of a communication system between individual scanner/data processors and a host computer.

FIG. 7 depicts a communications system in which the harness of the present invention is used to hold a portable data system having a wireless transceiver. An operator 806 carries the harness of the present invention supporting a portable data system including a handheld scanner. The portable data system is connected to a base/data transfer station 808 via a wireless link. Base/data transfer station 808 in turn is connected via the wireless link to an external host computer 810. Other base/data transfer stations such as 804 can be provided throughout a working space for communication with other operators such as 802 with a portable data system including data keypad carried on a vest, such as described in co-pending application to Gary G. Little, filed on even date herewith for 'Computer And/Or Scanner System Incorporated Into A Garment'.

The base/data transfer stations can be equipped to receive data from the portable data systems carried by operators 802, 806, and to transmit the data to host computer 810. In the alternative, the base/data transfer stations can be equipped to communicate instructions or other data to the users of the portable data systems, and to receive data or instructions from the host computer 810. Further, the individual base/data transfer stations can be configured to receive and transmit only to preselected portable data systems, providing data and/or instructions pertinent only to those preselected portable data systems.

The aforementioned radio transfer system is of particular benefit for tracking inventory contained in large enclosures. To facilitate communication in large enclosures filled with potential signal-blocking material, the base/transfer stations can be mounted on the ceiling as shown in FIG. 7. Specific types of the inventory can be tracked using preselected base/data transfer stations and/or preselected portable data systems. Data transfer from the base/data transfer stations to the central processor can be carried out on a multiplex basis, or using multiple transceivers located at the host computer 810.

Figure 4:
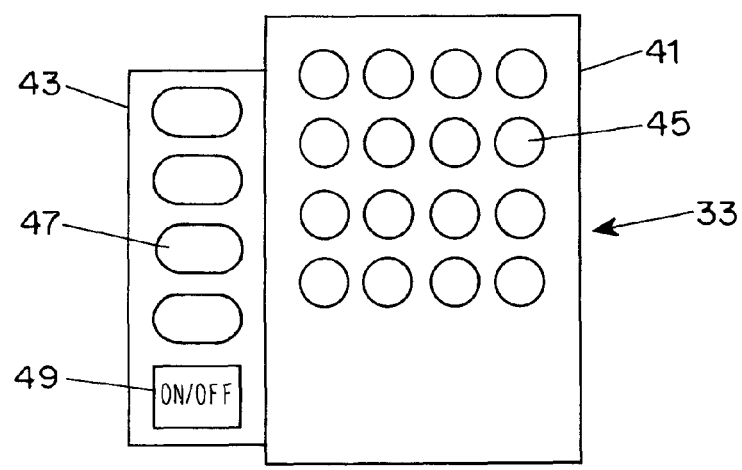
FIG. 4 is a plan view of a touch sensitive keyboard, set up for right handed operation, as could be used in the data system illustrated in FIGS. 1 to 3.

The keyboard 33 is small enough to fit in one of the pockets 23 and is configured for one-handed operation. FIG. 4 illustrates one example of the keyboard set up for right handed operation. As shown, the keyboard includes two sections, 41 and 43. The large section 41 has four columns of keys, one column for operation by each finger of the right hand. The smaller section 43 has a single column of keys for operation by the thumb of the right hand. For left hand operation, the small section would be located at the opposite side of the large section 41. In the illustrated example, each column of keys in the large section 41 includes four input keys 45, and the section 43 has four input keys 47 and an "ON/OFF" key 49 for controlling system power. The columns could include smaller or larger numbers of keys as appropriate for desired data input operations. The keyboard, however, should include relatively few keys as shown so that the operator can easily holster the keyboard 33 in the pocket 23.

The input keys 45 are typically used for input of actual alphanumeric data. The alphanumeric value(s) assigned to each key, alone or in combination with one or more of the function keys 47, can be programmed into the data processor 31 and the keyboard 33. For example, repeated activation of one of the four function keys might cycle the keyboard 33 through a numeric mode and one or more alphabetic modes. The numeric mode might emulate the number pad on a computer keyboard or on a calculator, and the alphabetic modes might emulate a segment of an alphabetic key set. For the operator's convenience, the LCD display may provide an indication of the current keyboard mode.

The other function keys 47 would permit the operator to program in a variety of special functions. For example, the system might be trained or programmed so that in certain modes each key represents a long string of alphabetic or control character inputs. The system may also recognize concurrent activation of plural keys (chording) to further extend the range of possible data inputs through the limited set of keys on keyboard 33.

As noted above, the keyboard is configured to allow one handed operation without its removal from pocket 23 in the belt 11. The cabling providing the power and signaling connections to the keyboard, however, will be long enough and flexible enough to permit the operator to occasionally remove the keyboard from the pocket, hold it in one hand and operate it with the other. The cabling to the keyboard would be short enough and/or coiled to retract into and be stored in the pocket 23 with the keyboard. In the alternative, the keyboard can be mounted on the same type of flip-out module as described with respect to the display. The keyboard can be deactivated when closed into the module and activated by a microswitch when it is extended away from the module in a manner similar to that previously described with respect to the display.

A variety of known optical reading devices may serve as the scanner 37. One particularly advantageous type of reader is an optical scanner which scans a beam of light, such as a laser beam, across the indicia. Such laser scanner systems are generally designed to read indicia having parts of different light reflectivity, e.g., bar code symbols, particularly of the Universal Product Code (UPC) type, at a certain working or reading distance from a hand-held or stationary scanner.

In a typical optical scanner system (not shown), a light source such as a laser generates a light beam which is optically modified to form a beam spot of a certain size at the working distance and is directed by optical components along a light path toward a bar code symbol located in the vicinity of the working distance for reflection from the symbol. An optical sensor or photodetector having a field of view extending across and slightly past the symbol detects light of variable intensity reflected off the symbol and generates electrical signals indicative of the detected light. A scanning component is situated in the light path. The scanning component may either sweep the beam spot across the symbol and trace a scan line across and past the symbol, or scan the field of view of the photodetector, or do both.

A digitizer processes the analog signal to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as auto discrimination. Typically, the various decoder functions are performed by a microprocessor, with associated program memory and random access data memory.

In a typical implementation of the portable data system shown in the drawings, the scanner would include at least the laser light source, the scanning component or other means for producing beam motion, and the photodetector. The digitizer and/or the microprocessor decoder may be also elements of the scanner. In such a case, the scanner would provide digital data signals to the data processor. Alternatively, the data processor may perform the decoder function. In this later case, the digitizer may be in the scanner or the digitizer may be in the module housing 51.

The cabling providing the power and signaling connections to the optical reading unit will be long enough to permit the operator to take the unit out of the pocket 22 and use the optical reading unit to scan a bar code or other indicia. The cabling to the optical reader unit should be short enough and/or coiled to retract into and be stored in the pocket 22 with the optical reading unit. If the optical reading unit is a moving spot scanner, such as a hand-held pistol-type scanner unit, the system operator would remove the optical scanner from its belt pocket 22 and point it at the indicia. The operator would then activate a manual electro-mechanical trigger switch (not shown) on the scanner to activate the scanner's light beam, the internal scanning motor, the photodetector and the detector and decoder circuitry.

Figure 6:
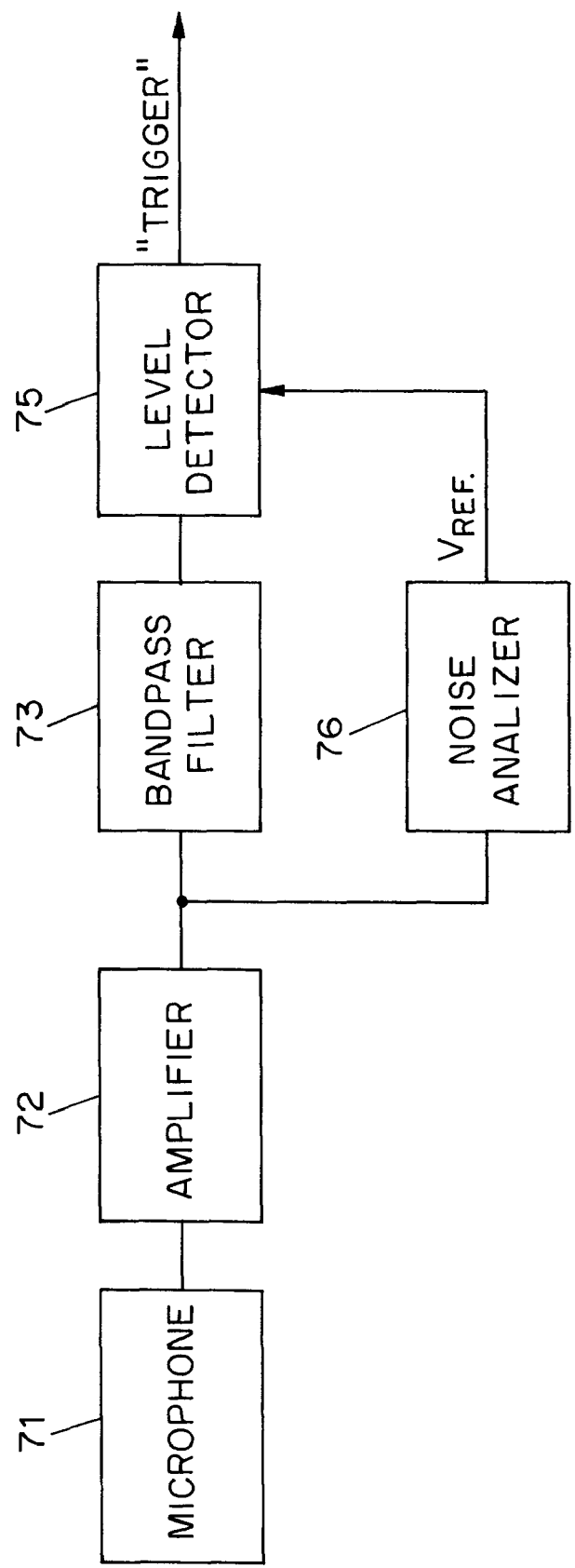
FIG. 6 is a simplified electrical block diagram of a voice activation system for the scanner.

In the alternative, the scanner can be triggered by an acoustic activation rather than by the electromechanical trigger switch. The acoustic activation may come from a wireless acoustic trigger or an operator's voice signals. The acoustic trigger would be positioned in proximity to the scanner and be situated on an operator's finger for ease of triggering. Such wireless triggering enhances the flexibility of the distributed system to enable further system's ergonomic optimization. A typical acoustic voice activation system is illustrated in FIG. 6 and includes a microphone 71 which can be mounted in a variety of locations so as to pick up an audio command on the part of the operator. An amplifier 72 receives the signal from the microphone and boosts it to a level suitable for analysis. Band pass filter 73, noise analyzer 76 and level detector 75 perform an analysis of the amplified signal from amplifier 72 to determine if a signal indicative of a preselected audio command has been amplified. The band pass filter 73 selects frequencies within the command range while the noise analyzer 76 detects those frequencies outside of the desired range. Level detector 75 makes a determination as to the sufficiency of the signal passed through band pass filter 73 as falling within the parameters of the predetermined command signal. If the required conditions are met, a trigger signal is output from level detector 75 activating the scanner.

Figure 16:
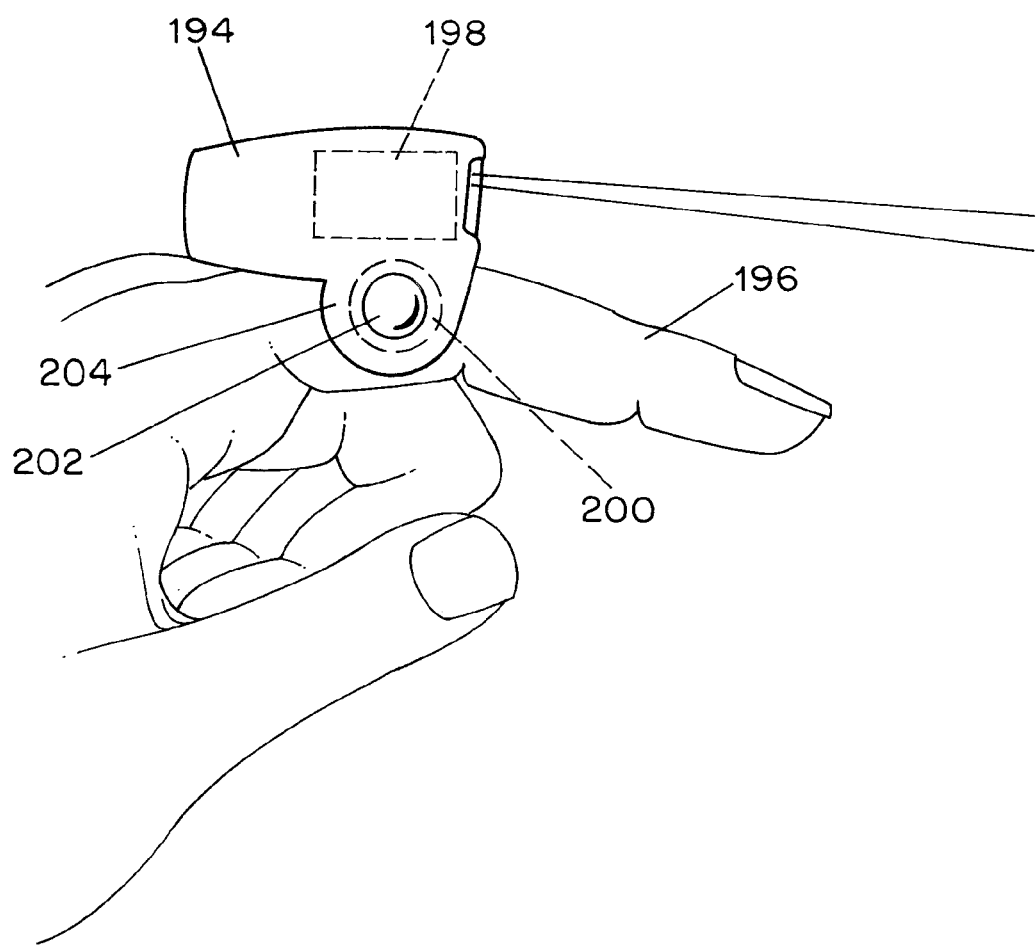
FIG. 16 is an embodiment of an optical trigger for triggering a scanner or an imager of the present invention.

In another embodiment the scanner can be triggered by an optical trigger. The optical trigger includes a photodetector which senses the presence, or absence of ambient light. As illustrated in FIG. 16, a ring scanner 194 is positioned on top of an operator's finger 196, and includes scanning electronics 198 and an optical trigger section 204 which extends along the side of the finger. The trigger section includes a photodetector 202 which senses the ambient light. The photodetector 202 is protected by an optically transmissive window 200. The operator triggers the scanner by placing one of his other fingers over the window 200, thus blocking the ambient light from the photodetector 202. The electronic trigger circuitry associated with the photodetector senses the change in the amount of current flowing through the photodetector due to a change in the amount of light impinging onto the photodetector. Once the change in current is sensed, a signal is generated to trigger the scanner. The trigger-associated circuitry may include a monostable multivibrator to latch the trigger signal. In addition, the circuitry may include a threshold or Automatic Gain Control (AGC) circuit to enable the trigger to respond to a predetermined level of light, or absence thereof, as well as requiring the rate of change of impinging ambient light to pass a threshold before generating the trigger signal.

In another embodiment, the photodetector is located further away from the scanner housing surface, for example, within the scanning electronics section 198. In such case, an optical conduit (light pipe) is used to deliver the ambient light to the photodetector. In situations when the scanner is to be used in both, the left-handed and the right-handed mode of operation, a single photodetector-trigger is used with two trigger sections 204 extending along both sides of the finger. Each of the oppositely located trigger sections includes one optically transmissive window. A two-ended light-pipe is used to deliver the ambient light from each of the optically transmissive windows onto the sensing photodetector.

In another embodiment, instead of an simple optical trigger switch, the scanner may use an optical-array trigger. The optical array consists of a number of photodetectors arranged in a predetermined manner. Having the optical-array allows the detection circuitry to sense a specific type of finger movements, like pointing of a finger, not only a change in the light intensity across a single optical detector. This, in turn reduces a number or false triggering due to minor movements of the operator fingers.

In another embodiment the scanner may be triggered by a radio frequency transmitting trigger. Because of the proximity of the trigger to the scanner (within a few feet) the transmitting power of the trigger is low, which in turn reduces the size of the battery required for powering up the trigger.

Instead of a laser scanner, one may use a solid state imager, such as a CMOS or CCD imager. Two-dimensional solid state detecting devices are particularly useful in imaging two-dimensional images, such a two-dimensional bar codes. Solid state imager differs from a laser scanner in that an imager illuminates the whole image being read and detects the optical energy reflected from the illuminated image. Thus there is no need to optically scan the image in a raster or other predetermined pattern, as done in case of a laser scanner. The detected optical energy is converted into electrical signals of varying amplitudes corresponding to the illuminated image. The circuitry inside the imager reads out the electrical signals and processes them accordingly.

Figure 17:
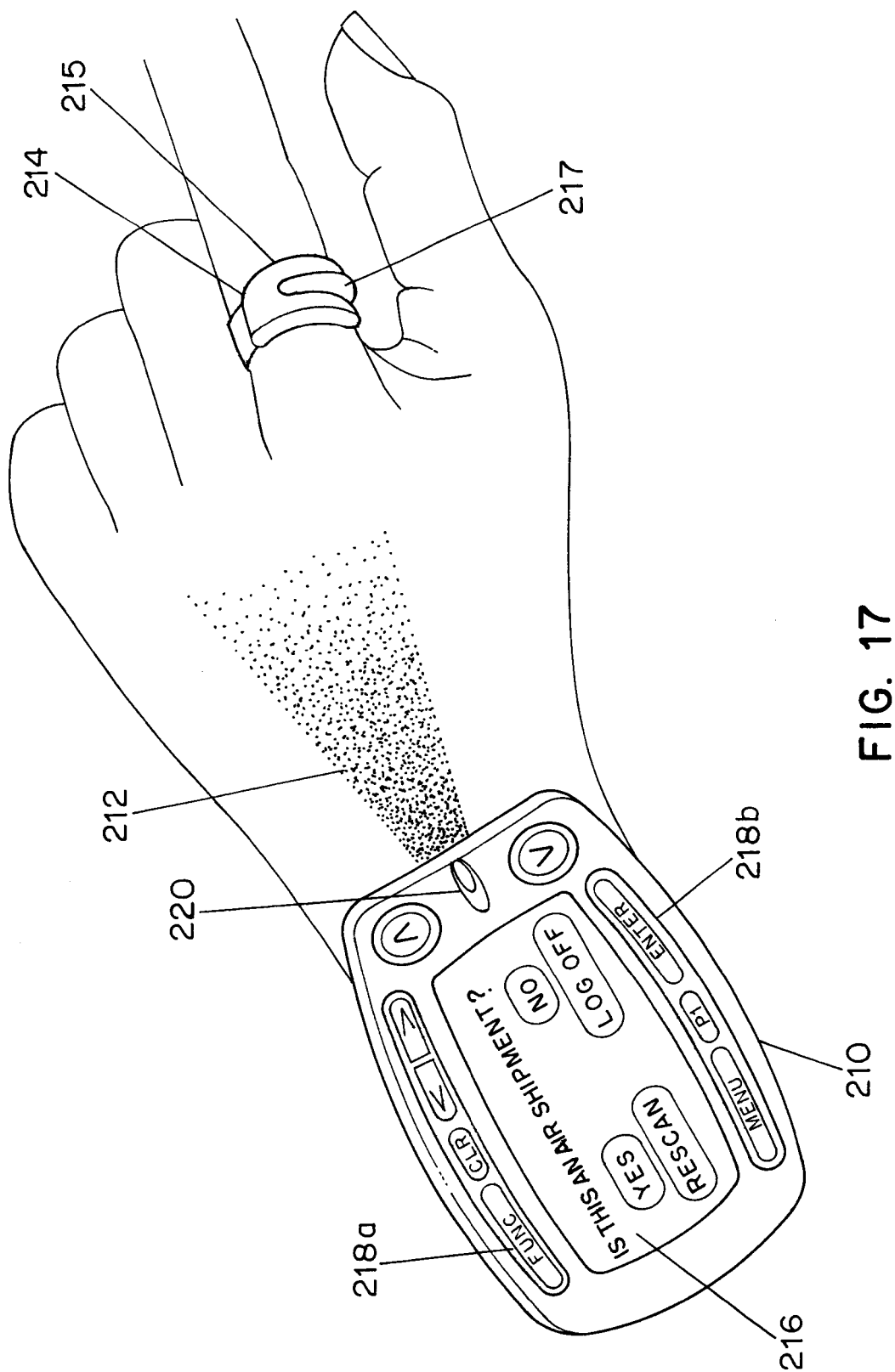
FIG. 17 is an embodiment of a scanner integrated into a wrist unit and triggered by a wireless trigger.

Another embodiment contemplated by the present invention is shown in FIG. 17. FIG. 17 depicts a wrist unit 210 having a scanner, or an imager, integrated within. The wrist unit of FIG. 17 also includes a touch screen display, a number of function keys, for example 218a and 218b, and a scan/decode indicator 220. The scanner outputs a scanning beam 212 which is projected toward a target. The scanner is triggered via wireless trigger 214 located on one of the operator's fingers, by the operator pressing a trigger button 217. The trigger could be an acoustic trigger, an radio frequency (RF) transmitting trigger, infra red (IR) transmitting trigger, or any other type of remote trigger which can be used to activate the scanner. The circuitry built into the trigger 214 is distributed in such a way as to minimize the size and profile of the trigger. The trigger and the wrist unit may use a flexible battery 215 which can be molded to fit a desired shape. One example of a flexible battery is as lithium polymer battery. In cases where two scanners for reading at different ranges, or for reading different types of indicia, are used in a single wrist unit, a trigger having two activation buttons may be used. Alternatively, a dual position button may also be used. The CPU unit may be integrated unto the wrist unit of FIG. 17, in which case the wrist/CPU combination would be called a control unit, or the CPU could be located on another part of the operator's body as part of the distributed communication system.

Alternatively, the optical reading unit may take the form of a contact or wand type device. In this case, the operator would turn on the data system, touch the tip of the wand to the surface on which the indicia appears and manually move the tip across the indicia.

The present invention may use a variety of alternative forms of the moving spot optical scanners, or solid state imagers. For example, scanners have been proposed wherein the light beam source is located in a separate module. One or more optical fibers carry the light from the source to a scan head unit which includes optical elements for producing the scanning motion of the beam. Published European Patent Application No. 264,956 discloses one example of such an optical code reader unit using an optical fiber. To adapt this approach to the optical reader in the present invention, the laser diode for producing the scanning beam would be located within the module 50. An optical fiber (not shown) would then connect the module 50 in FIG. 2A to the scan head unit 37. The optical fiber would be sewn into a channel of the belt or woven into the fabric of the belt, in a manner similar to that used for the various flexible cable type electrical connections discussed earlier.

With the laser light source located in the module 50, additional fibers may be added for carrying light therefrom to other parts of the harness for other purposes. In particular, the distal ends of a number of these additional fibers could extend out through the surface of the belt fabric at various points. The light emitted from the exposed distal ends of the fibers would be visible to other persons looking at the person wearing the system harness. Because each fiber end emits a very narrow beam of light, however, the light visible from any given direction is limited. Light from different exposed fiber ends are visible only from different view points. As a result, when the person wearing the harness moves with respect to an observer, the visible light and/or the color thereof tends to change. This can provide a particularly pleasing decorative effect and/or makes observance of the person wearing the belt or harness easy at night or in other dark environments.

The preferred embodiment includes two input means, the keyboard and the optical scanner. The portable data system may include other inputs, such as a mouse or joy stick, either in addition to the two input means used in the preferred embodiment or as a replacement for the keyboard and the scanner. As disclosed above, typical scanning system comprises a scanning unit and a computer for processing data. The computer includes a CPU and an input/output ports, such as keyboard and a display. The computer can be further broken up into a CPU unit and an input/output (I/O) unit. The CPU unit can be made powerful enough to be able to process graphics and/or perform voice recognition.

Figure 8:
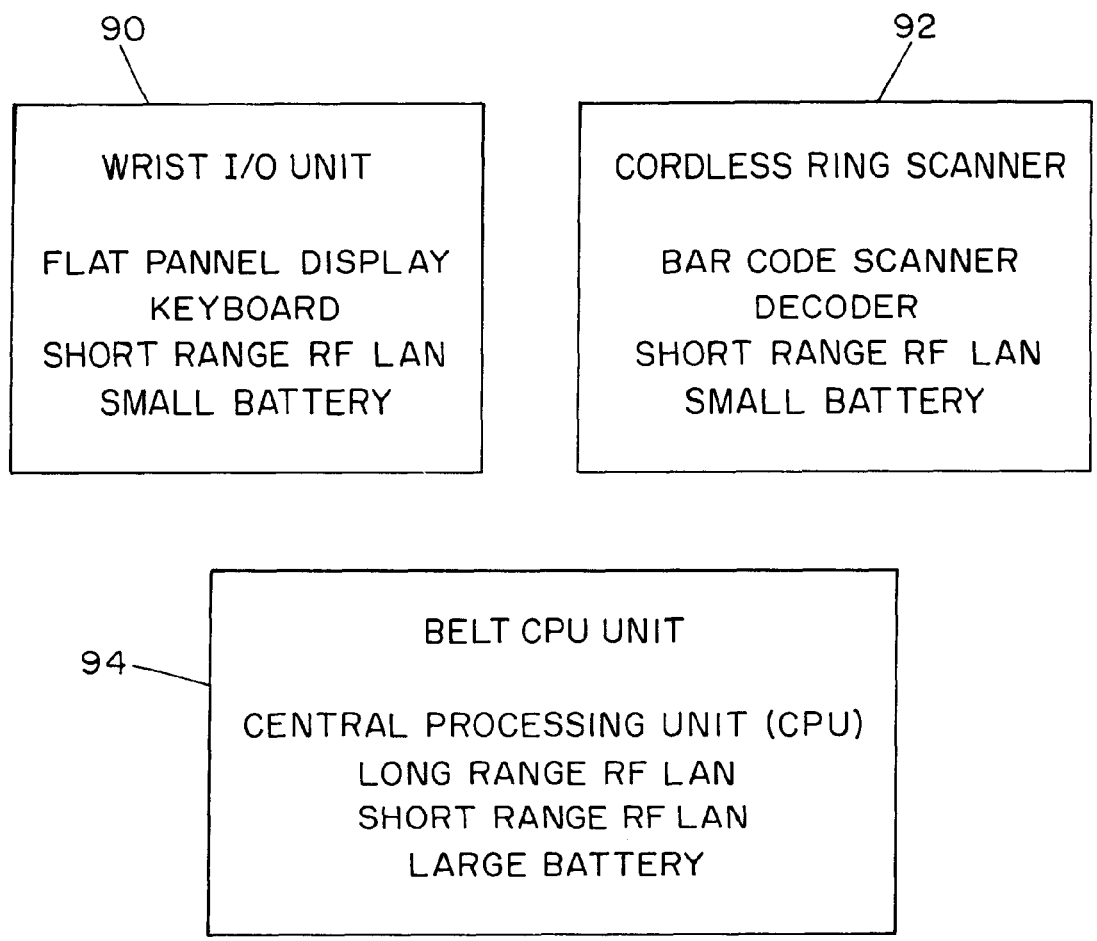
FIG. 8 is a block diagram of a distributed scanning system.

FIG. 8 is a block diagram of an alternative embodiment of the present invention and illustrates a new ergonomic allocation of scanning system components on an operator's body. In such an embodiment, the distributed system includes a CPU unit 94, an input/output (I/O) 90 unit and a scanning unit 92 communicating with each other over a Personal Area Network (PAN). The scanner can be a handheld or a wearable scanner, such as a ring scanner manufactured by Symbol Technologies. The ring scanner, which is worn on an operator's finger, can communicate with the I/O unit over a wired cable or a wireless channel. The wireless channel could be an RF or an infrared channel. The system can also use a "body area communication network" or Spectrum24 communication network manufactured by Symbol Technologies. In "body area communication network" the operator's body serves as a conduit for communication between the different system components. Other peripheral devices, such as printers, can be interconnected to the system to enhance its capabilities. In the preferred embodiment shown in FIG. 8, the three system components communicate over a wireless network. The scanner further includes a decoder, a short range RF transmitter, or transceiver, and a battery. The scanner communicates with the I/O unit 90 which is preferably worn on a wrist. The wrist I/O unit 90 includes a display, preferably a flat panel display, a keyboard, an RF transceiver and a battery. The present invention contemplates the use of thin-display technologies, such as the chip-on-glass technology used with some of the LCD displays. Placement on the LCD drive and processing electronics on the rear surface of the display reduces the overall display thickness, which in turn reduces the thickness of the wrist I/O unit. The wrist I/O unit 90 communicates with CPU unit 94 over a short range wireless channel. In order to improve the ergonomics of the system, the scanner 92 and the wrist I/O unit are made as light as possible. In order to better balance the weight of the system components, the CPU unit 94 contains the heavy and bulky system elements and is therefore preferably worn on an operator's belt ("harness"). The belt CPU unit can either be clipped onto a belt or have a belt attached to it and be worn as a "fanny pack". Other allocations of the CPU unit on the operator's body are also possible. FIGS. 10*a* through 10*h* illustrate various views of the Belt CPU unit of the present invention having a belt clip design. Reference numeral 140 represents a power switch and the reference numeral 142 represents a number of various display indicators. The unit can also have audible indicators. In an alternate embodiment, the system can be voice activated and/or controlled. The belt CPU unit 94 includes a system central processing unit (microprocessor), a short range RF transceiver, a Long Range RF transceiver and a battery. The RF transceivers can use the resources of the microprocessor to control their operations. The power requirements of the CPU unit 94 are typically greater then the power requirements of either the Wrist I/O unit 90 or the Scanner 92. Therefore the battery included with the Belt CPU unit 94 will typically be larger then the batteries in the other two system components. This in turn would reduce the size and weight of the other two system components. In an alternative embodiment the decoder can be moved out of the scanner 92 and placed in either the wrist I/O unit or the CPU unit. By efficiently distributing the system components on the operator's body, each of the individual components can then be optimized for its particular position. The system can also use flexible batteries, such as lithium polymer batteries, which can be optimized to fit a particular mechanical configuration and outline of the respective system components.

Figure 9A:
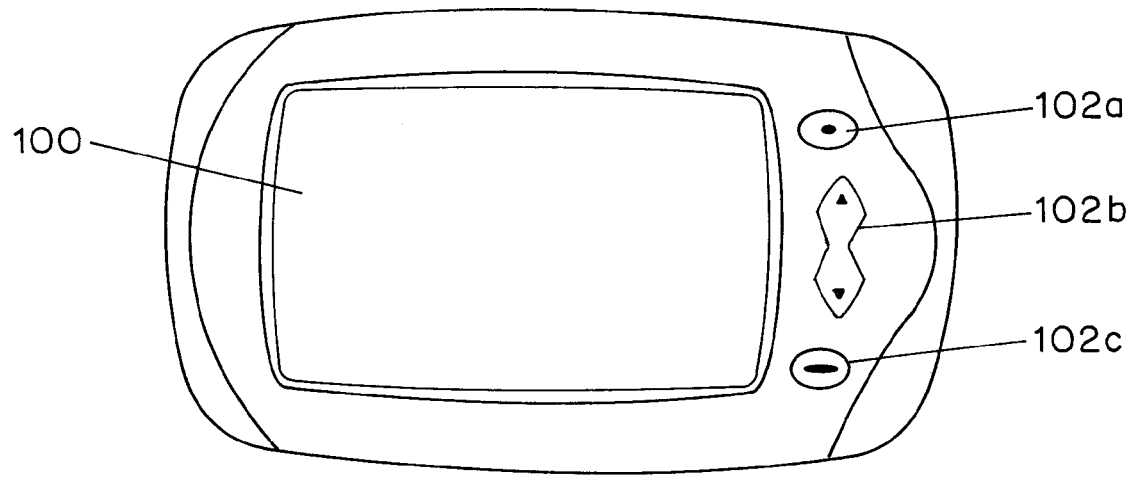
FIGS. 9a–h are various embodiments of the wrist I/O unit.
Figure 9B:
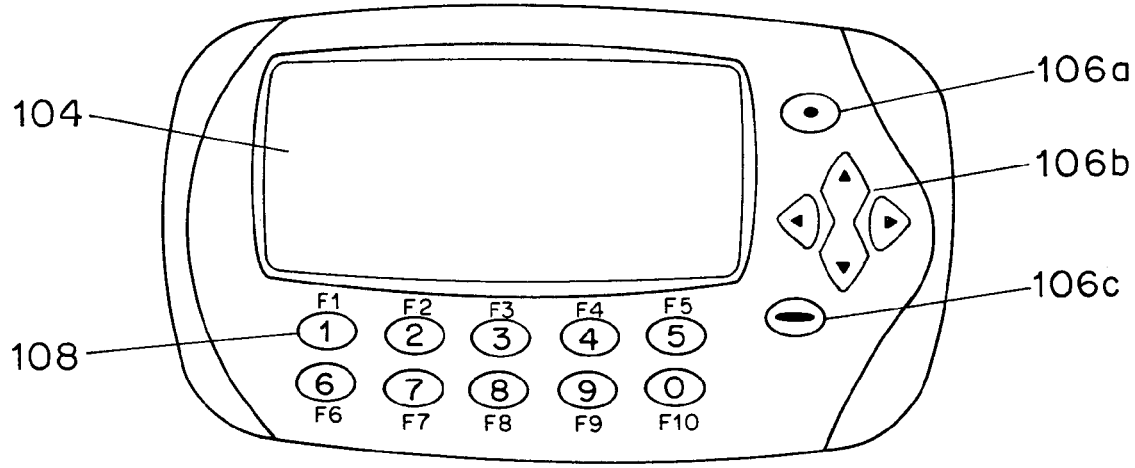
Figure 9C:
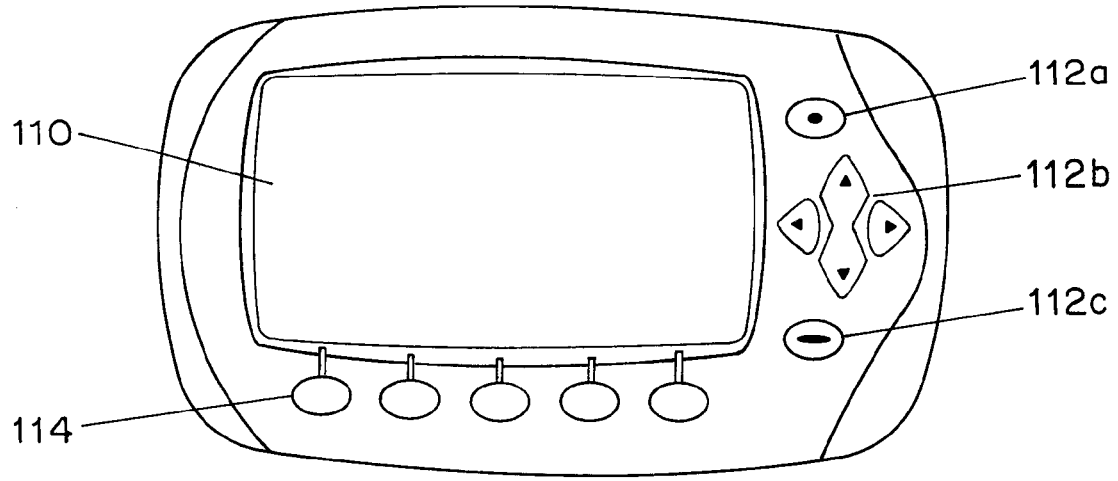
Figure 9D:
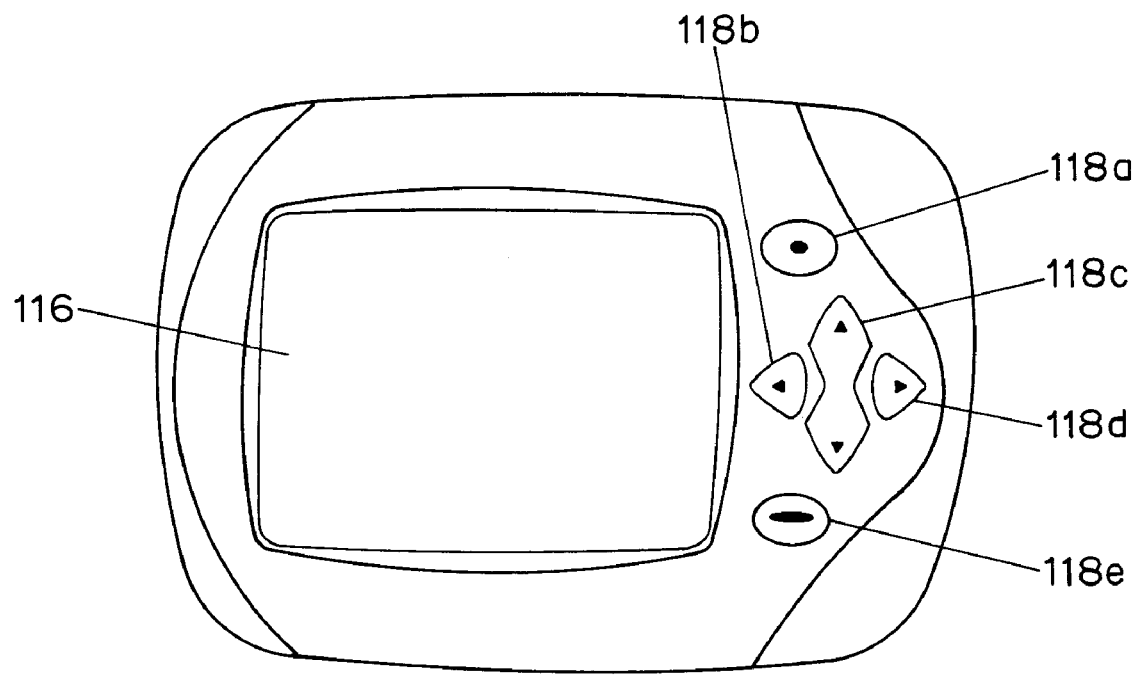
Figure 9E:
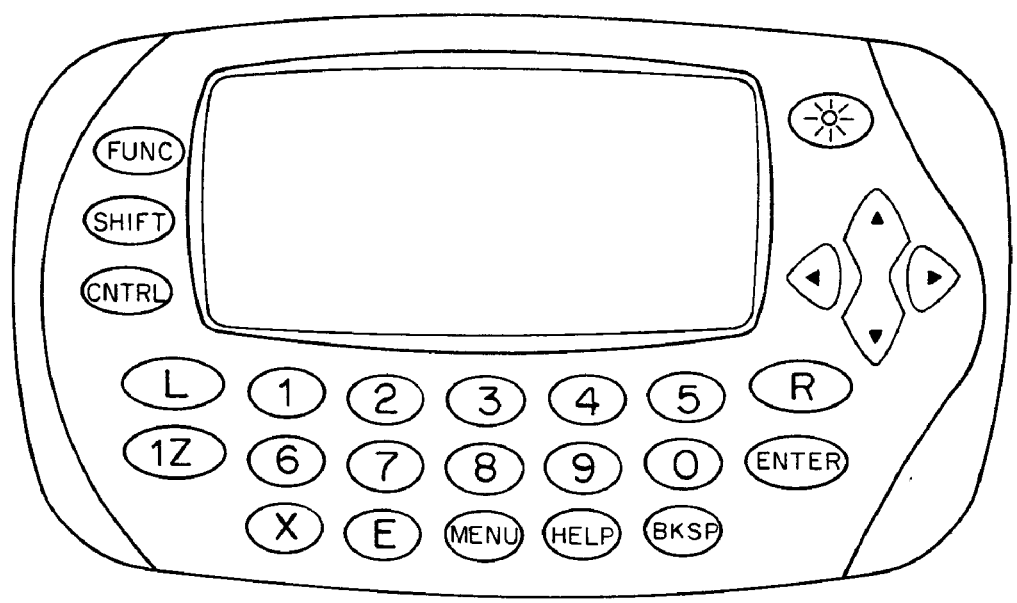
Figure 9F:
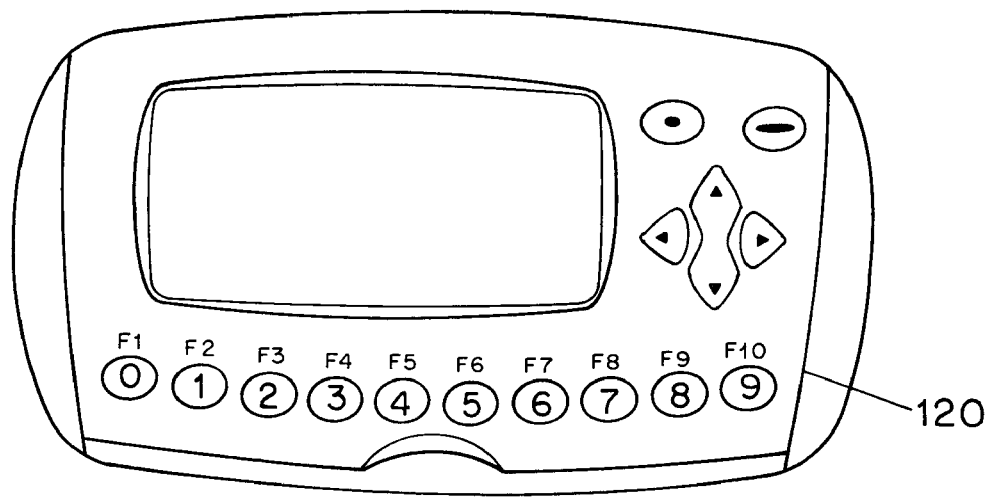
Figure 9G:
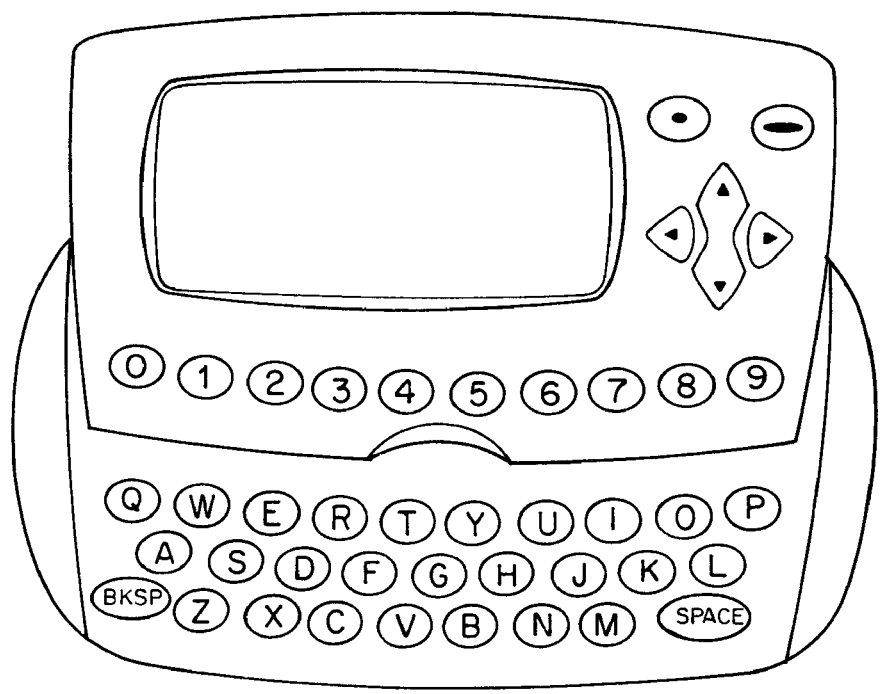
Figure 9H:
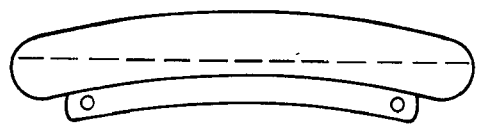

FIGS. 9*a*–*g* illustrate various embodiments of the wrist I/O unit of the present invention. FIG. 9*a* shows a unit having a touch screen 100 and a few control keys 102*a*–*c*. FIG. 9*b* shows a wrist I/O unit having a touch screen 104, a few control keys 106*a*–*c*, and a number of function keys 108. FIG. 9*c* illustrates is a wrist I/O unit having a touch screen 110, a few control keys 112*a*–*c*, and a reduced number of function keys 114. FIG. 9*d* illustrates the wrist I/O unit of FIG. 9*a* with a reduced touch screen 116 and a few additional control keys 118*a*–*e*. FIG. 9*e* illustrates a wrist I/O unit having a large number of both, the keys and the function keys. FIG. 9*f* illustrates a wrist I/O unit having combined function and control keys 120. FIG. 9*g* illustrates an expandable wrist unit providing for a large number of both, the control and the function keys. In an alternative embodiments, the wrist I/O unit can have a clam-shell design or a butterfly type of keypad which would unfold to the sides. FIG. 9*h* illustrates the top view of the wrist I/O units of FIGS. 9*a*–*h*. As can be seen from FIGS. 9*a*–*h*, depending on the application, a number of different wrist I/O unit designs are possible. In addition, the wrist unit may have a customer specific protective shell which could be modified for different customers with relative ease. The shell could be made out of plastic or rubber material and would be a disposable wear item into which a standard wrist unit is inserted. Having a protective shell over the wrist unit in certain cases makes the unit less susceptible to shock a vibration, and provides customer specific ergonomic look-and-fit features.

A bar code scanner, a wrist unit and a CPU unit can be distributed on an operator's body in such a way as to minimize fatigue and to enhance ergonomic comfort of the overall system. The wrist unit can receive operator inputs via a keypad, a touch screen or via a microphone. In addition to the three components listed above, the system may also include additional peripheral components, such as a printer, a magnetic-stripe reader, PDA, cell-phone, etc. In certain configurations, the wrist unit and the CPU unit may be combined into a single control unit, which in itself may become a PDA, a cell phone or a portable PC. The system with its components distributed on an operator's body is called a Personal Area System (PAS).

Figure 11:
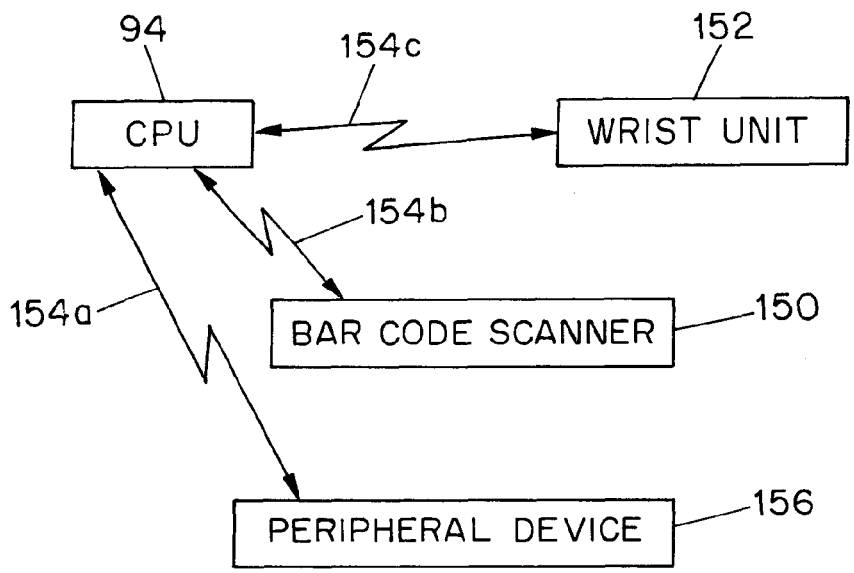
FIG. 11 is a block diagram of a personal area system according to the invention.

FIG. 11 depicts a block diagram of a PAS according to the preferred embodiment of the present invention. The system includes a CPU 94, a wrist unit 152, a bar code reader 150 and a peripheral device 156. All of the PAS components communicate with each other via the CPU 94 using a set of wireless communication links 154a, 154b, and 154c. These communication links form a Personal Area Network (PAN). Because of the proximity of the system components to one another, the wireless communication channel can be a short range communication channel, such as a short range RF, Infrared, "body area" communication link, or an acoustic communication link. In an alternative embodiments the system can be fully hard-wired or may contain a mix of wireless and hardwired devices. In another embodiment, the individual devices of a PAS may communicate directly with each other, instead of communicating through the CPU 94, as depicted in FIG. 11. Thus, the elements of the PAS can communicate with each other directly or through the CPU unit. The wrist unit 152 can have a display, a touch screen, a keyboard. In one embodiment, the wrist unit can have a tactile touch-screen overlay which would act as a keypad. Because different customers may want to rearrange the touch-screen display to accommodate their applications, custom touch-screen overlays can be designed and made to fit over a standard touch-screen. In addition, the wrist unit can have a speaker and a microphone for enabling voice input into the system and voice outputs to the user. While the scanning function is accomplished by the bar code scanner, decoding of the scanned data can take place in either the bar code scanner, the wrist unit, or the CPU unit. In the former case, the scanner would transmit the decoded bar coded information to either the wrist unit or the CPU unit, while in the later case the scanner would transmit an undecoded digital representation of the bar code and the respective receiving unit, the wrist unit or the CPU unit, would perform the decoding.

In a typical scanning system, where the wrist and the CPU units are combined into a single device, called the controller, bar code scanner sends undecoded data to the controller. The controller decodes the data and transmits a decode acknowledgement signal back to the bar code scanner. The decode acknowledgement signal controls a decode indicator on the bar code scanner which signals to the operator, via a visual or an audio indication, that the bar code was successfully decoded. In the case of a wireless bar code reader having a bi-directional communication link with the controller, the bar code scanner must include a transmitter and a receiver. The bi-directional communication link with the scanner can either be symmetric or asymmetric link. Typically the amount of date sent from the scanner to the controller is greater then the amount of date received by the scanner from the controller. Having asymmetrical communication link (high speed transmitter/low speed receiver) reduces the power consumption, complexity, cost, and size of the receiver in the scanner.

In the case of a ring size scanner, where internal circuitry space is at a premium, it may be advantageous to eliminate the receiver and to only include a transmitter. In such a case the communication link with the scanner is one-directional, namely from the bar code scanner to the controller, the decode acknowledgement indicator has to be provided on a component other than the bar code scanner. The feedback to the user can be accomplished by any one, or combination, of the following options: turning on a visual indicator, a sound indicator, or a tactile indicator. Tactile ("vibrating") indicators are especially useful in a noisy environment, or in systems where the visual indicator is located out of the operator's field of view. In a distributed wearable system of FIG. 8, the decode indicator can be position on either a wrist unit 90 or on a belt CPU unit 94. In case the bar code scanner does not have a receiver, it would have a scan timeout feature which would shut off the scanner after a predetermined period of time, regardless of whether the bar code has been successfully decoded.

Figure 12:
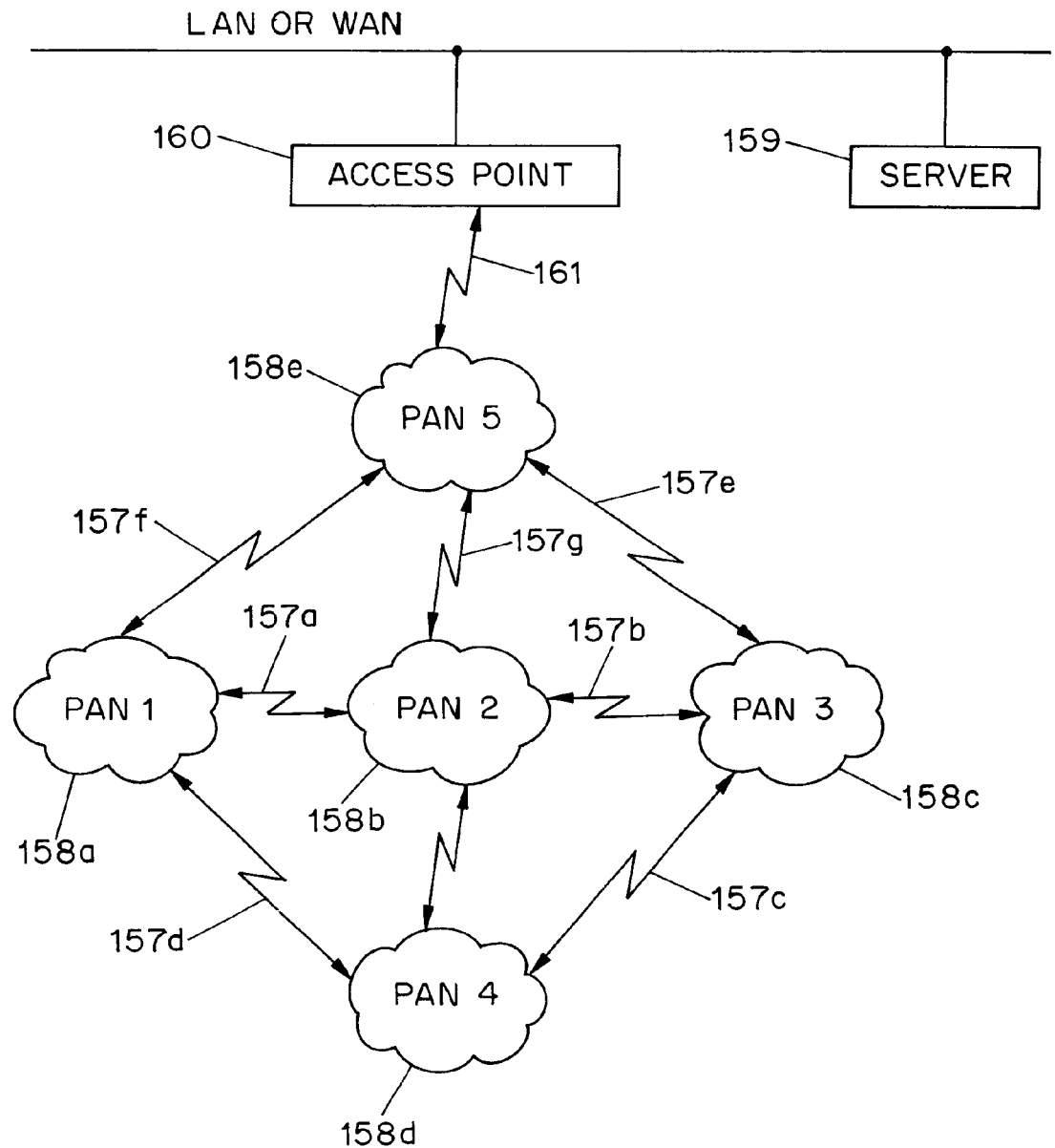
FIG. 12 is a block diagram of one embodiment of a cluster of personal area systems according to the present invention.

FIG. 12 illustrates an embodiment of the invention in which a number of PASs represented by reference numerals 158a, 158b, 158c, 158d and 158e communicate with each other via a number wireless channels 157a, 157b, 157c, 157d, 157e, 157f and 157g. This network of PASs which are capable of communicating with each other is called a PAS cluster. Any one of the individual PASs of the PAS cluster can gain access to a device 159 connected on a LAN or a WAN network via an access point 160. In FIG. 12, the device 159 is depicted as a server. The access point 160 is connected to the LAN or the WAN. Communication between the access point 160 and the PAS Cluster is accomplished using a wireless communication channel 161. The channel 161 could be a long range communication channel, such a Spectrum24 communication channel. Spectrum24 access points are manufactured by Symbol Technologies, the assignee of the present invention.

Figure 13:
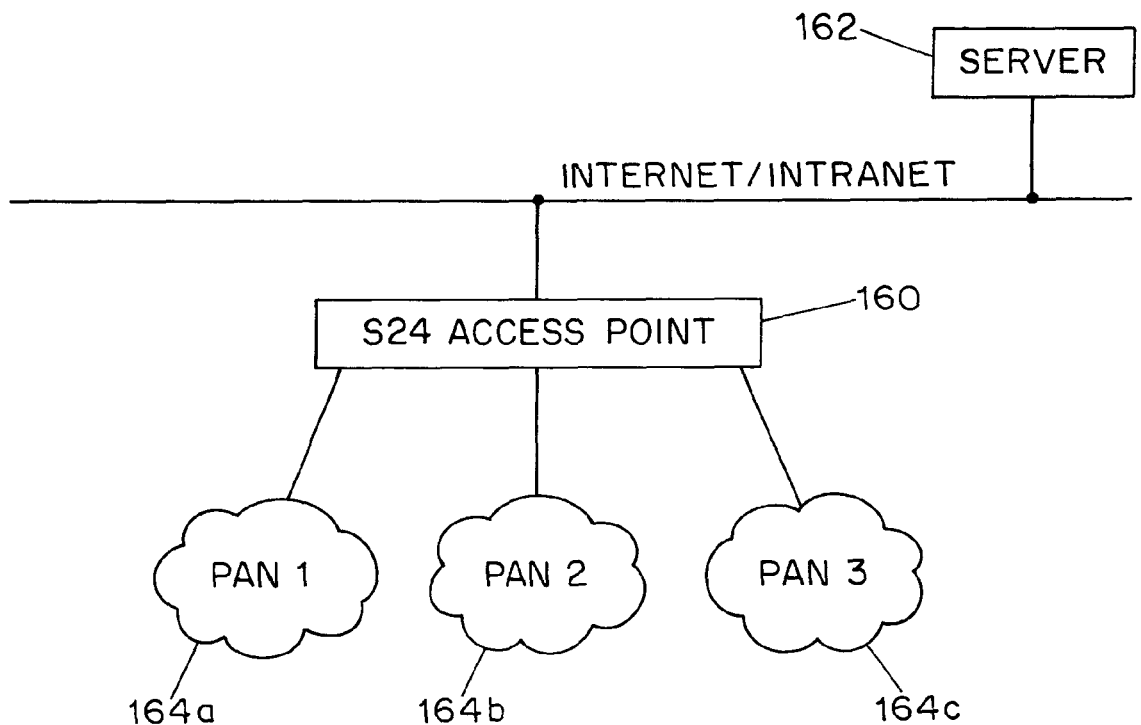
FIG. 13 is a block diagram of an alternate embodiment of a cluster of personal area systems of the present invention.

FIG. 13 depicts another embodiment of the PAS cluster. Individual PASs 164a, 164b and 164c, in order to communicate with each other must do so by transferring data through the access point 160, which acts as a central node of the PAS cluster, instead of communicating with each other either directly or through another PAS as illustrated in FIG. 12. The access to the server 162 or any other device connected to a LAN, such as an Ethernet, or to a WAN, such as an Internet, is still accomplished by passing data through the access point 160.

Figure 14:
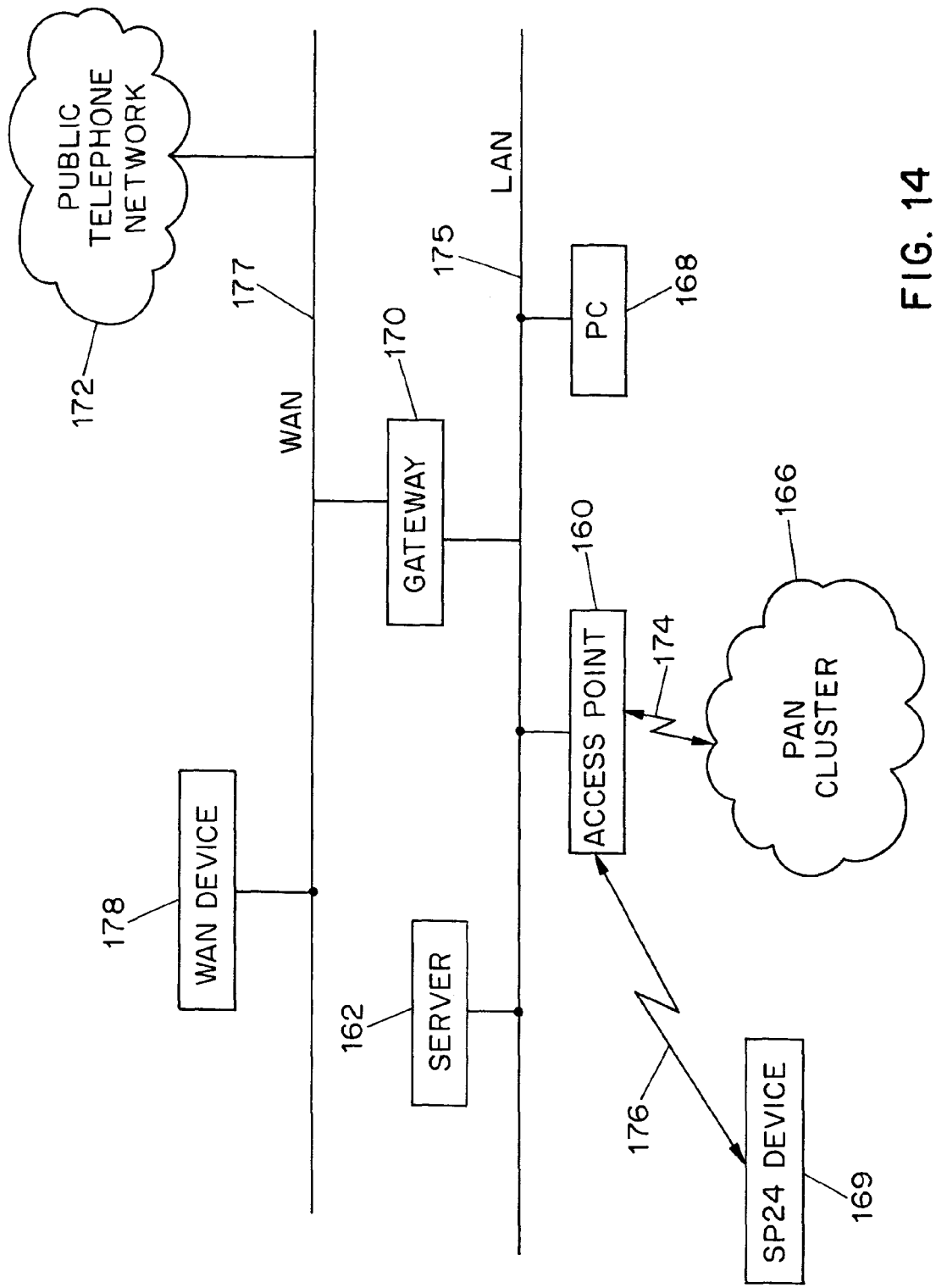
FIG. 14 is a block diagram of a Multilevel network model including a cluster of personal area systems of the present invention.

FIG. 14 illustrates a block diagram of a multilevel network model. PAS cluster 166 is connected to the access point 160 via a wireless communication link 174. The access point 160 can communicate with another device 169 outside the PAS cluster via a wireless link 176. Both links 174 and 176 could be Spectrum24 communication links. The access point 160 also serves to connect the PAS cluster 166 or the device 169 to a LAN 175. A server 162 attached to the LAN 175 can communicate with any of the devices associated with the access point 160. The LAN 175 may also be connected with a wide Area Network (WAN) 177 via a gateway 170. The gateway can be a network router or a switch. Thus, any device attached to the WAN can communicate with any device attached to the LAN and in turn exchange data with the devices and PAS clusters associated with the access points. In FIG. 14, a WAN device 178 can communicate with the devices in the Public Telephone Network 172 over the WAN without using the gateway 170. However, the gateway connection is used to interconnect the WAN device 178 with the server 162, PC 168, or the access point 160, all of which are attached to the LAN 175. If individual PAS include voice-to-data (packets) conversion feature, the respective PAS users can voice communicate with the telephone users of the public telephone network 172. In order to achieve this, the voice signals are converted into digital data and this digital data is transmitted over the LAN and or WAN in their respective formats. For example the WAN data format may be an internet format. Thus, voice signals can be transmitted over the internet protocol (Voice over IP). The server 162 could be connected to the WAN instead of the LAN. Yet, because the devices associated with the access point 160 can communicate with the WAN devices, the individual PAS would still be capable of communicating with the server 162. When the scanner used is actually a two-dimensional imager, in addition to the voice signals, the system may convert optical image data detected by the imager to digital data signals and transmit the digitized video signals to a remote device, such the server 162. The image may either be displayed, analyzed, or be stored for future use at the remote device. The server can be a database or a processing station. If the individual PASs have voice-to-data or video-to-data conversion capability, the server could be used to perform automatic speech or image recognition. The server would process the data, recognize the voice command, or process the video image, and return the recognized command back to the wrist unit. In the alternative embodiment, automatic speech recognition may be done directly by one of the components of the individual PAS, such as the CPU 94, or the wrist unit 152 of FIG. 11. Automatic speech recognition enhances system's flexibility and provides user with a true hands free scanning and data entry operation. The individual PASs can have their own Internet addresses, and the CPU 94, or the wrist unit 152, could provide paging, phone and other functions. Devices of the personal area systems can act as personal digital assistants (PDAs), portable terminals, cell-phones, pagers, lap-tops or any other devices which can be connected to the Ethernet and/or Internet.

Figure 15:
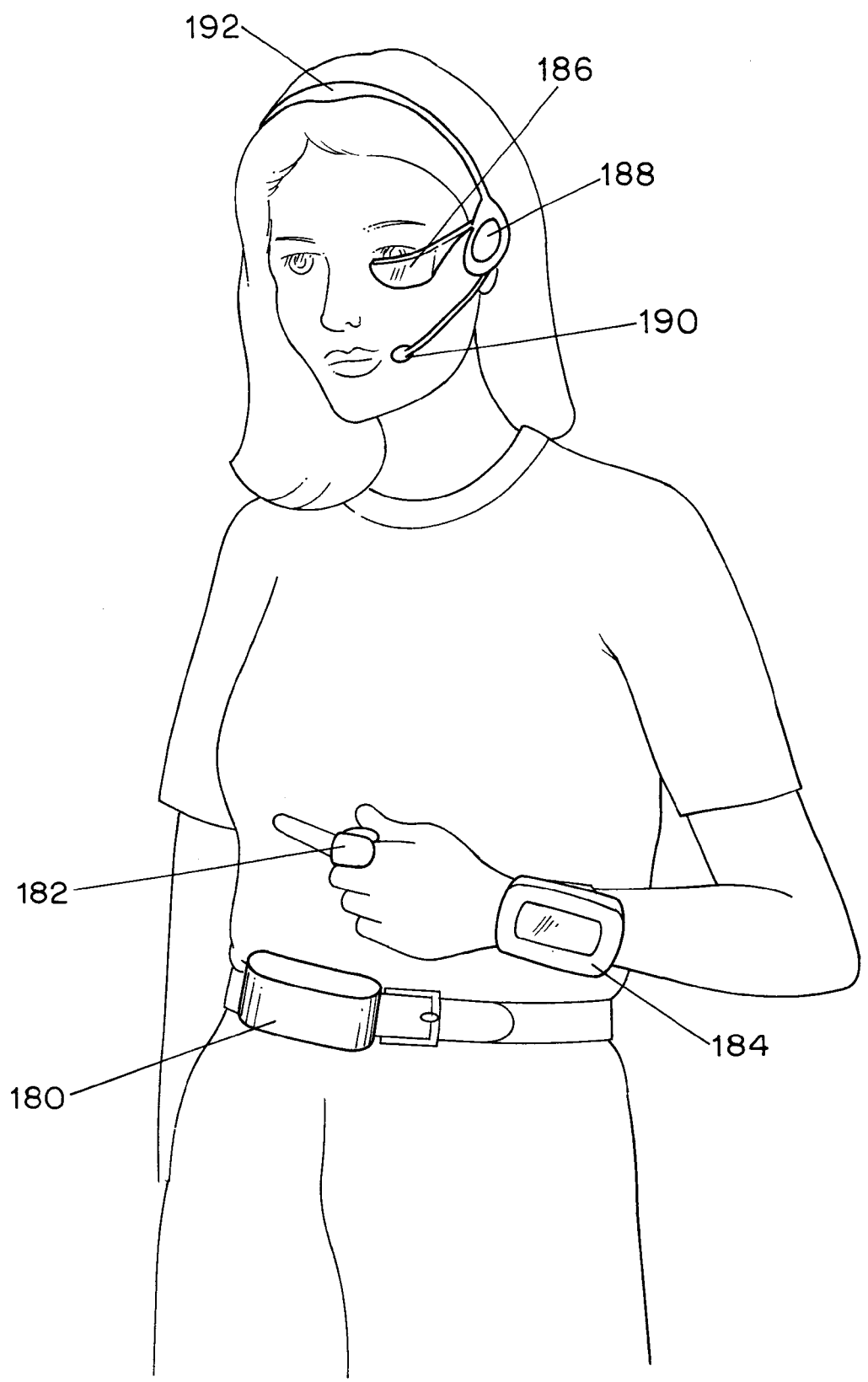
FIG. 15 is an alternate embodiment of a personal area system of the present invention.

FIG. 15 depicts an alternate embodiment of the Personal Area System of the present invention. The Personal Area System depicted in the FIG. 15 includes a CPU 180, a wrist unit 184 and a scanner or an imager (182). It should be pointed out that the scanner and the wrist unit can be worn on either hand to allow the user a dominant hand operation. A right-handed user may want to wear the scanner on his right hand and the wrist unit on his left hand. Another user may want to switch the location on the scanner and wrist units for his own comfort. The scanner is designed to be worn and triggered by either hand. The wrist unit can have a feature which would allow it to change the displayed orientation of the text and graphics to accommodate both, right and left handed operators. In addition, the operator is shown wearing a headset 192. The headset, which is also a part of the PAS, includes a speaker 188, a microphone 190 and an eyepiece display 186 of the type disclosed in an article entitled "Inside Big Blue", authored by Steve Ditlea and published in the December 1998 issue of Popular Mechanics magazine. The eyepiece display is designed to be positioned in front of the operator's eye without interfering with the operator's field of view. The unobtrusive eyepiece display includes a display chip and a magnifier. Another type of an eyepiece display could be a projection type display, where the information is projected from the top, or the bottom of the eyepiece, onto a clear optical surface in front of the operator's eye. This way the operator's field of view would remain unabstracted during operation of the PAS. Alternatively, the system may incorporate display technology of the type used in a product called Eye-Trek, manufactured by Olympus Corporation. The headpiece would also include a transceiver for communicating with other PAS devices. All the components communicate with each other via a Personal Area Network. In addition, the above disclosed PAS can communicate with devices connected to the LAN or a WAN. The CPU 180, or the wrist unit 184, could run a Windows-CE or other operating system and allow voice recognition, as well as voice communication over the Internet. Present day technology allows increased integration of digital and radio-frequency components. Using the present day technology, a transceiver capable of communicating voice of a particular network protocol, such as an Internet protocol, can be made to fit within approximately 2 square inches of chip surface area. The power consumption of such highly integrated circuit is greatly reduced, allowing for a smaller battery. Such minimum space requirement makes the headpiece a perfect device into which a communication module (phone) can be incorporated. The phone electronics may be integrated directly into an ear-piece. The battery is also mounted onto the headset. In order to make a phone call over a local or a wide area network, a user activates the phone module by pressing a specific function button on the headpiece or via a voice command. Dialing is accomplished via a voice connection to a server. A software on the server performs voice recognition. After turning on the unit, the user speaks the name or the phone number of the party with whom he wants to communicate. The server software converts the spoken words into an address and passes the information back to the phone. The phone module then initiates a call using any one of the necessary communication protocols, for example an H.323 protocol. For a called party, a tone will be played indicating an incoming call and the caller identified via a voice message. The called party may accept or reject the call by a voice prompt or by pressing an appropriate button on the device. It should be noted that the phone module can also be integrated into a wrist or a CPU unit and its operation could still proceed as disclosed above. In cases where the PAS system includes an imager, the server is able to provide image recognition function in addition to voice recognition function.

The system capable of communicating voice data to another device could accommodate any one of four different types of voice operating applications.

A first type of voice related application is called a "store and retrieve" application. In the "store and retrieve" application the user would record his voice message and store it in a data file on the wrist unit, the CPU, or a storage memory in the headpiece. The user would then send this file to another device on the local or wide area network, such as the Internet. This file could be sent to another user' voice mail for future retrieval. "Store and retrieve" system described above has been implemented in a device called PDT 7200, manufactured by Symbol Technologies, the assignee of the present invention.

A second type of voice related application is a "telephony" type application. In this application, a user can establish a half or full duplex voice communication with another party over a local or a wide area network. The user's voice would be transmitted to the other party in a format suited for a particular communication network. For example, the user's voice can be digitized and transmitted over the Internet using Internet Protocol (Voice over IP).

A third type of voice related application is a called a "voice response" application. In the voice response application, the system would provide voice feedback to the user during the user's operation of the PAS. For example, after the user scans a bar code, the system would respond to the user with a voice statement such as "The item's bar code has been decoded. Please pick up the item and place it in bin number three." Such voice response could be provided in parallel with putting the actual text on the display of the wrist unit or of the headpiece. The operator would then have a choice of either looking at the display or listening to the voice prompts. This type of system is well suited for pick-and-place warehouse applications.

A forth type of voice related application is called a "voice recognition" application. The user would speak into the microphone of the PAS system, the system would recognize the user commands and perform the requested function.

Any one of the above voice-type applications could be combined with a manual entry-type application. For example, in one possible application of the above PAS system, an operator could either manually, or using a voice command entered into the system via a speaker 190, activate the scanner (imager) 182. The scanner would scan a bar code on an item, or take an image of the item. One of the PAS components would then decode the bar code. The decoded information or the image would then be sent to a server, or another device located on the LAN or a WAN. The server would process the received information and transmit a response data back to the PAS. The data received from the server may be displayed on the eyepiece display 186, the wrist unit display 184, or it may be voice communicated to the operator via a speaker 188. In addition, the operator may request information from the server by establishing a network connection over a Spectrum24 channel and the Internet and entering his request through the microphone or a keyboard.

In an alternative embodiment, the system will include a miniature voice-over-IP communication module and a voice recognition device. The communication module can be designed into a headset or integrated into another body wearable device. The voice recognition device can be a network server or a body wearable unit. The system can recognize the user' audio commands and establish a communication channel with another party. The channel will be established via a local or wide area network, such as the Internet. The voice data will be digitized and formatted to comply with the channel protocol before being sent out over the channel. The voice recognition feature allows the user to have a phone module providing hands free phone operation.

The wrist unit may take the form of a watch. The CPU unit 180 may be combined with the wrist unit 184 into a single device called a control unit. The control unit may be worn on the operator's belt or may be designed in the from of a watch.

In another embodiment the wrist unit would have a personal computer type mouse-button, the actuation of which would control the position of a pointer of the headpiece display.

The above PAS may be supplemented by a tactile force measuring device designed in the form of a glove and worn on an operator's hand. The device would include a strain (force) gauge sensor that would sense the amount of force exerted by the operator's hand in performing a certain task and convert the sensed value into an electrical signal. The device would measure the tactile force exerted by the operator in handling of an article, and communicate the tactile force information to the operator via a display, or a speaker, located either on a wrist unit or on the headpiece. The use of tactile force measuring device is especially beneficial in an environment, like an automotive shop, where a mechanic must apply a particular amount of force to manually tighten an automotive part. The PAS disclosed above enables an operator to work in a truly "hands free" environment.

A variety of additional modifications of the system described above will be apparent to readers who are skilled in the art, without departing from the spirit of the invention.

We claim:

1. A personal communication system adapted to be distributed on a user's body, said system comprising:
   an input device having keys for entering user inputs into said system d a display for providing user outputs from said system, said input device having an indicia reading device;
   a ring member adapted to be worn on the user's finger, said ring member having a trigger button, a battery designed to fit around a portion of the user's finger, and wireless communication circuitry for communicating with said input device;
   a central processing unit in communication with said input device,
   wherein communication between said central processing unit and said input device is accomplished over a wireless communication channel.

2. The personal communication system of claim 1, further comprising a peripheral device in communication with said central processing unit.

3. The personal communication system of claim 1, wherein said indicia reading device is a laser scanner.

4. The personal communication system of claim 3, wherein said indicia reading device is a CCD scanner.

5. The personal communication system of claim 4, wherein said indicia reading device is a two-dimensional CCD scanner.

6. The personal communication system of claim 1, wherein said indicia reading device is a solid state imager.

7. The personal communication system of claim 6, wherein said solid state imager is a CMOS imager.

8. The personal communication system of claim 6, wherein said solid state imager is a CCD imager.

9. The personal communication system of claim 1, wherein said input device enables entry of voice commands.

10. The personal communication system of claim 9, further including a remote server in communication with said central processing unit for enabling automatic speech recognition of said voice commands entered into said input device.

11. The personal communication system of claim 10, wherein communication between said server and said central processing unit is accomplished using an internet communication protocol.

12. The personal communication system of claim 1, further including a remote server in communication with said central processing unit over an internet communication network for enabling speech recognition of a set of user's voice commands.

13. The personal communication system of claim 16, further including a server in communication with said central processing unit over an internet communication network for enabling speech recognition of user's voice commands.

14. The personal communication system of claim 16, wherein said indicia reading device and said controller are distributed on the same hand of the user.

15. The personal communication system of claim 16, wherein said controller is adapted to be worn on the user's forearm.

16. A personal communication system adapted to be distributed on a user's body, said system comprising:
   a controller configured to be worn on the arm of the user, said controller including
   i) an input unit having a touch screen display for accepting entry of user input data and providing user output data;
   ii) an indicia reading device for detecting optical information;

iii) a processor for processing said user input and output data and for associating said indicia reading device with said controller; and a ring member adapted to be worn on the user's finger, said ring member having a trigger, a battery designed to fit around a portion of the user's finger, and wireless communication circuitry for communicating with said controller.

17. The personal communication system of claim 16, further comprising a peripheral device in communication with said controller.

18. The personal communication system of claim 16, wherein said indicia reading device is a laser scanner.

19. The personal communication system of claim 18, wherein said indicia reading device is a CCD scanner.

20. The personal communication system of claim 18, wherein said indicia reading device is a two-dimensional CCD scanner.

21. The personal communication system of claim 16, wherein said indicia reading device is a solid state imager.

22. The personal communication system of claim 21, wherein said solid state imager is a CMOS imager.

23. The personal communication system of claim 21, wherein said solid state imager is a CCD imager.

24. The personal communication system of claim 16, wherein said controller enables entry of voice commands.

25. The personal communication system of claim 24, further including a server in communication with said central processing unit for enabling automatic speech recognition of said voice commands entered into said controller.

26. The personal communication system of claim 25, wherein communication between said server and said central processing unit is accomplished using an internet communication protocol.

* * * * *